(12) United States Patent
Kikuchi et al.

(10) Patent No.: US 7,082,781 B2
(45) Date of Patent: Aug. 1, 2006

(54) AIR CONDITIONING DEVICE

(75) Inventors: Yoshimasa Kikuchi, Osaka (JP); Tomohiro Yabu, Osaka (JP); Akira Kamino, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 14 days.

(21) Appl. No.: 10/475,429

(22) PCT Filed: Jul. 18, 2002

(86) PCT No.: PCT/JP02/07327

§ 371 (c)(1),
(2), (4) Date: Oct. 22, 2003

(87) PCT Pub. No.: WO03/008871

PCT Pub. Date: Jan. 30, 2003

(65) Prior Publication Data

US 2004/0129011 A1 Jul. 8, 2004

(30) Foreign Application Priority Data

Jul. 18, 2001 (JP) ............................... 2001-218291
Apr. 11, 2002 (JP) ............................... 2002-109258

(51) Int. Cl.
*F25D 23/00* (2006.01)
*F25D 17/06* (2006.01)

(52) U.S. Cl. ................. 62/271; 62/93; 62/97
(58) Field of Classification Search ............... 62/271, 62/93–97

See application file for complete search history.

(56) References Cited

U.S. PATENT DOCUMENTS

| | | | | |
|---|---|---|---|---|
| 5,170,633 A | * | 12/1992 | Kaplan | 62/94 |
| 5,353,606 A | * | 10/1994 | Yoho et al. | 62/271 |
| 5,517,828 A | * | 5/1996 | Calton et al. | 62/271 |
| 5,649,428 A | * | 7/1997 | Calton et al. | 62/94 |
| 5,653,115 A | * | 8/1997 | Brickley et al. | 62/94 |
| 5,817,167 A | * | 10/1998 | DesChamps | 95/113 |
| 6,361,588 B1 | * | 3/2002 | Moratalla | 96/4 |
| 6,442,951 B1 | * | 9/2002 | Maeda et al. | 62/94 |
| 6,711,907 B1 | * | 3/2004 | Dinnage et al. | 62/94 |

FOREIGN PATENT DOCUMENTS

| | | |
|---|---|---|
| JP | 51-078048 | 7/1976 |
| JP | 2000-257968 | 9/2000 |
| JP | 2001-174074 | 6/2001 |

* cited by examiner

*Primary Examiner*—Cheryl Tyler
*Assistant Examiner*—Filip Zec
(74) *Attorney, Agent, or Firm*—Birch Stewart Kolasch & Birch LLP

(57) ABSTRACT

Disclosed is an air conditioning apparatus which is provided with two adsorption elements (81, 82). The air conditioning apparatus repeats in alternation an operation in which the second adsorption element (82) is regenerated and, at the same time, air is dehumidified by the first adsorption element (81), and an operation in which the first adsorption element (81) is regenerated and, at same time, air is dehumidified by the second adsorption element (82). Additionally, the air conditioning apparatus includes a refrigerant circuit. The refrigerant circuit performs a refrigeration cycle in which a regenerative heat exchanger (92) operates as a condenser and a first cooling heat exchanger (93) or a second cooling heat exchanger (94) operates as an evaporator. For example, air, which has robbed heat of adsorption in the first adsorption element (81), is further heated by the regenerative heat exchanger (92) and is introduced into the second adsorption element (82). Consequently, the second adsorption element (82) is regenerated.

14 Claims, 13 Drawing Sheets

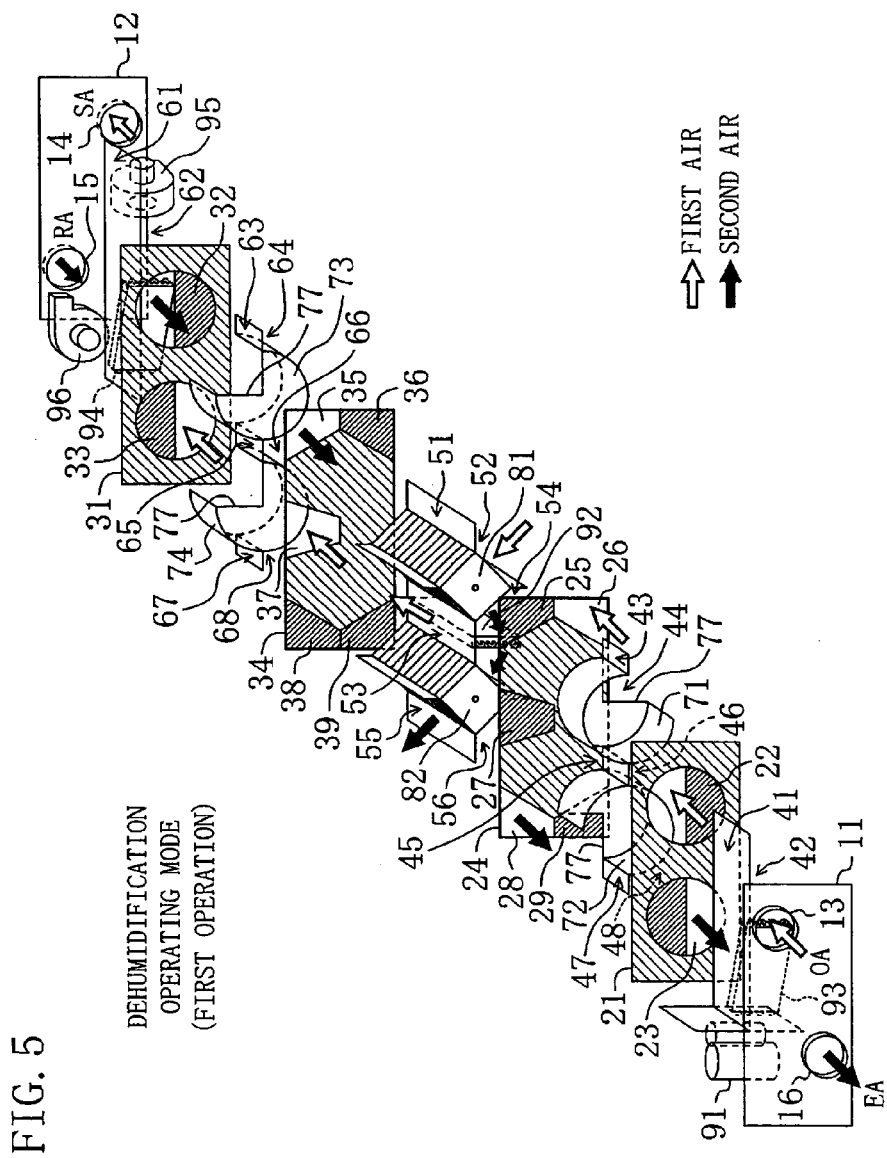

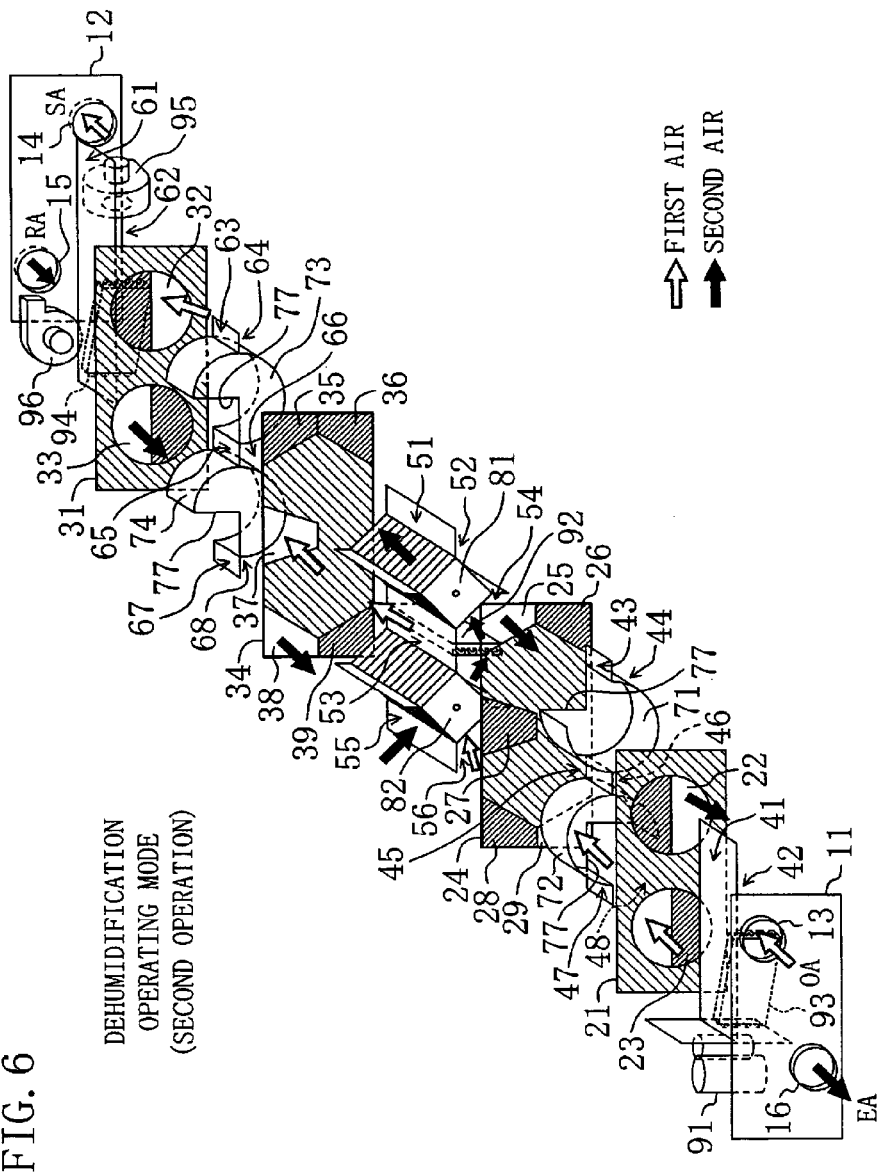

HUMIDIFICATION OPERATING MODE (FIRST OPERATION)

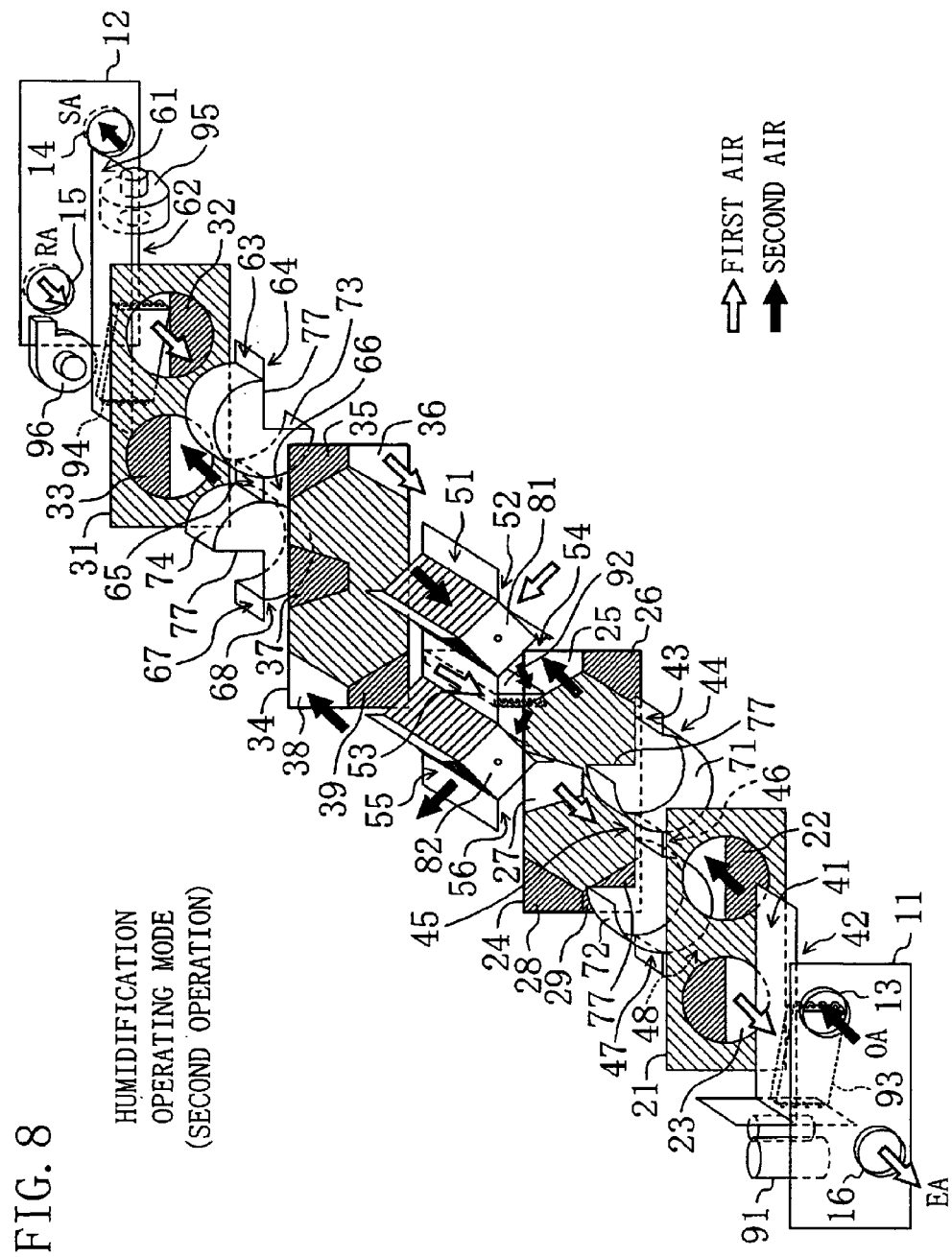

AIR CONDITIONING DEVICE

This application is the national phase under 35 U.S.C. §371 of PCT International Application No. PCT/JP02/07327 which has an International filing date of Jul. 18, 2002, which designated the United States of America.

BACKGROUND ART

The present invention relates to air conditioning apparatus, and more particularly to an air conditioning apparatus capable of adjusting both air temperature and air humidity.

TECHNICAL FIELD

Dehumidifiers for dehumidifying air by making use of an adsorbent have been known in the prior art. One such dehumidifier is disclosed in Japanese Patent Kokai Gazette No. (1987)68520. In this dehumidifier, air is brought into contact with an adsorbent of an adsorption element and water vapor contained in the air is adsorbed into the adsorbent, whereby the amount of water vapor contained in the air is reduced. Here, adsorption of the water vapor into the adsorbent results in generation of heat of adsorption. If air which is being dehumidified is heated by such heat of adsorption, then the relative humidity of the air decreases, thereby making it difficult to provide adequate dehumidification. To cope with this, the adsorption element of the dehumidifier is provided with an air passageway for cooling, thereby securing the amount of dehumidification of the air by robbing heat of adsorption.

In the above-described dehumidifier, the adsorbent must be regenerated for restoration of its adsorption ability. To this end, air is heated by an electric heater and the heated air is brought into contact with an adsorbent for removal of water vapor from the adsorbent.

PROBLEMS THAT INVENTION INTENDS TO SOLVE

In the above-described dehumidifier, however, air used for regeneration of the adsorbent is heated by an electric heater. This produces the problem that only a low energy efficiency is obtained. In other words, when air is heated by an electric heater, the amount of heating with respect to the air will never exceed the power consumption of the electric heater in any circumstances. Because of this, theoretically the power of dehumidification of the humidifier will never exceed the power consumption of the humidifier in any circumstances. Accordingly, it is impossible for the dehumidifier to provide a dehumidification power exceeding the energy consumption thereof and the fact that the energy efficiency is low produces another problem of running up costs of energy necessary for operations.

Bearing in mind the foregoing problems, the present invention was made. Accordingly, an object of the present invention is to improve the energy efficiency of an air conditioning apparatus capable of adjusting air humidity.

DISCLOSURE OF INVENTION

The present invention provides a first problem-solving means intended for an air conditioning apparatus which performs either an operating mode in which first air taken in is cooled and dehumidified and then supplied indoors or an operating mode in which second air taken in is heated and humidified and then supplied indoors. And, the air conditioning apparatus comprises a refrigerant circuit, including a compressor (91), a condenser (92), an expansion mechanism, and an evaporator (93, 94), for performing a refrigeration cycle, and an adsorption element (81, 82, 150) in which are divisionally formed a humidity adjusting side passageway (85) where flowing air comes into contact with an adsorbent, and a cooling side passageway (86) through which air flows for taking heat of adsorption from the humidity adjusting side passageway (85), wherein the air conditioning apparatus performs a dehumidifying operation in which the first air is dehumidified by the humidity adjusting side passageway (85) of the adsorption element (81, 82, 150) and thereafter is subjected to heat exchange with refrigerant in the evaporator (93, 94), and an adsorbent regenerating operation in which the second air, after passing through the cooling side passageway (86) of the adsorption element (81, 82, 150), is subjected to heat exchange with refrigerant in the condenser (92) and thereafter is introduced into the humidity adjusting side passageway (85) of the adsorption element.

The present invention provides a second problem-solving means according to the first problem-solving means wherein in the adsorption element (150) a dehumidifying operation is carried out by causing first air to flow through some of humidity adjusting side passageways (85) of the adsorption element (150) and, concurrently with the dehumidifying operation, a regenerating operation is carried out by causing second air to flow through the remaining of the humidity adjusting side passageways (85) of the adsorption element (150).

The present invention provides a third problem-solving means according to the first problem-solving means wherein adsorption elements (81, 82) are provided, and the air conditioning apparatus performs in alternation a first operation in which a dehumidifying operation is carried out by causing first air to flow through a humidity adjusting side passageway (85) of the first adsorption element (81) and, concurrently with the dehumidifying operation, a regenerating operation is carried out by causing second air to flow through a humidity adjusting side passageway (85) of the second adsorption element (82), and a second operation in which a dehumidifying operation is carried out by causing first air to flow through the humidity adjusting side passageway (85) of the second adsorption element (82) and, concurrently with the dehumidifying operation, a regenerating operation is carried out by causing second air to flow through the humidity adjusting side passageway (85) of the first adsorption element (81).

The present invention provides a fourth problem-solving means according to the third problem-solving means wherein the air conditioning apparatus further includes an air flow path (54, 115) for regeneration by which an outlet side of a cooling side passageway (86) of any one of the first and second adsorption elements (81, 82) is brought into communication with an inlet side of a humidity adjusting side passageway (85) of the other of the first and second adsorption elements (81, 82), and the condenser (92) is so disposed as to cross the regeneration air flow path (54, 115).

The present invention provides a fifth problem-solving means according to either the third problem-solving means or the fourth problem-solving means wherein the first and second adsorption elements (81, 82) are each shaped like a square column with four side surfaces, and in each of the first and second adsorption elements (81, 82) the humidity adjusting side passageway (85) has openings in a pair of opposite side surfaces of the four side surfaces and the cooling side passageway (86) has openings in another pair of opposite side surfaces of the four side surfaces, and the first and second adsorption elements (81, 82) are disposed such that the longitudinal direction of the first adsorption element (81) corresponds to the longitudinal direction of the second adsorption element (82) and, in addition, a diagonal line of an end surface of the first adsorption element (81) and a diagonal line of an end surface of the second adsorption element (82) lie in a straight line.

The present invention provides a sixth problem-solving means according to any one of the third to fifth problem-solving means wherein the air conditioning apparatus is so constructed that the route of flows of the first air and the second air is changed for switching between the first operation and the second operation.

The present invention provides a seventh problem-solving means according to the sixth problem-solving means wherein the route of flows of the first air and the second air is changed by activating an opening/closing mechanism (140, . . . ) for opening and closing an air flow path with the adsorption elements (81, 82) fixed in place.

The present invention provides an eighth problem-solving means according to the sixth problem-solving means wherein the route of flows of the first air and the second air is changed by activating an opening/closing mechanism (71, . . . ) for opening and closing an air flow path, and by rotating the adsorption elements (81, 82).

The present invention provides a ninth problem-solving means according to the second problem-solving means wherein the adsorption element (150), shaped like a doughnut, is rotationally driven and comprises an alternating arrangement of plural humidity adjusting side passageways (85) and plural cooling side passageways (86) in a circumferential direction thereof.

WORKING

In the first problem-solving means, the air conditioning apparatus performs a dehumidifying operation and a regenerating operation. During that time, refrigerant circulates in the refrigerant circuit and a vapor compression refrigeration cycle is performed.

In the first place, in the dehumidifying operation first air is introduced to the humidity adjusting side passageway (85) of the adsorption element (81, 82, 150). In the humidity adjusting side passageway (85), water vapor contained in the first air is adsorbed into the adsorbent, resulting in generation of heat of adsorption. On the other hand, second air is flowing through the cooling side passageway (86) of the adsorption element (81, 82, 150). The heat of adsorption generated in the humidity adjusting side passageway (85) is taken by the second air flowing through the cooling side passageway (86). Accordingly, the temperature rise of the first air flowing through the humidity adjusting side passageway (85) is suppressed. The first air dehumidified in the adsorption element (81, 82, 150) then liberates heat to refrigerant in the evaporator (93, 94) and is cooled. In this way, the dehumidifying operation provides dehumidified and cooled air.

In the second place, in the regenerating operation the second air, which has taken heat of adsorption in the adsorption element (81, 82, 150), absorbs heat from the refrigerant in the condenser (92) and is heated accordingly. In other words, the second air is heated by heat of adsorption of the water vapor and heat of condensation of the refrigerant. Thereafter, the second air is introduced into the humidity adjusting side passageway (85) of the adsorption element (81, 82, 150). In the humidity adjusting side passageway (85), the adsorbent is heated by the second air and, as a result, water vapor is desorbed from the adsorbent. Stated another way, the adsorbent is regenerated. The water vapor desorbed from the adsorbent is given to the second air. In this way, the regenerating operation provides heated and humidified air.

And, the air conditioning apparatus of the present problem-solving means performs either an operating mode in which air dehumidified and cooled by the dehumidifying operation is supplied indoors or an operating mode in which air heated and humidified by the regenerating operation is supplied indoors.

In the second problem-solving means, in the single adsorption element (150) a dehumidifying operation of causing water vapor to be adsorbed into the adsorbent is performed in a part of the adsorption element (150) and, concurrently with the dehumidifying operation, a regenerating operation of causing water vapor to be desorbed from the adsorbent is performed in the remaining part of the adsorption element (150).

The third problem-solving means provides an air conditioning apparatus having adsorption elements (81, 82). The air conditioning apparatus performs in alternation a first operation and a second operation. In the first operation, a dehumidifying operation of causing water vapor to be adsorbed into the adsorbent in the first adsorption element (81) is performed concurrently with a regenerating operation of causing water vapor to be desorbed from the adsorbent in the second adsorption element (82). On the other hand, in the second operation a dehumidifying operation of causing water vapor to be adsorbed into the adsorbent in the second adsorption element (82) is performed concurrently with a regenerating operation of causing water vapor to be desorbed from the adsorbent in the first adsorption element (81). In other words, in each of the adsorption elements (81, 82) air dehumidification by the adsorbent and regeneration of the adsorbent are carried out repeatedly in alternation.

In the fourth problem-solving means, an air flow path for regeneration is provided. The condenser (92) of the refrigerant circuit is so arranged as to cross the regeneration air flow path. In the regenerating operation, the second air, which has absorbed heat of adsorption of the humidity adjusting side passageway (85), flows out to the regeneration air flow path (54, 115) from the cooling side passageway (86) of the adsorption element (81). The second air flowing through the regeneration air flow path (54, 115) is subjected to heat exchange with refrigerant when passing through the condenser (92) and is heated. The second air after heat exchange is introduced into the humidity adjusting side passageway (85) of the adsorption element (82) through the regeneration air flow path (54, 115).

In the fifth problem-solving means, the first and second adsorption elements (81, 82) are each shaped like a square column with four side surfaces. In each of the adsorption elements (81, 82), the humidity adjusting side passageway (85) penetrates from one side surface to its opposite side surface. In addition, the cooling side passageway (86) penetrates from one side surface different from the side surface in which the humidity adjusting side passageway (85) has an opening to its opposite side surface. In other words, in each of the adsorption elements (81, 82) the direction in which air flows through the humidity adjusting side passageway (85) is orthogonal to the direction in which air flows through the cooling side passageway (86).

The first and second adsorption elements (81, 82) each shaped like a square column are arranged in such orientation that their longitudinal directions agree with each other. In addition, the first and second adsorption elements (81, 82) are quadrangular at their end surfaces. And, the first and second adsorption elements (81, 82) are arranged in such orientation that one diagonal line of an end surface of the first adsorption element (81) and one diagonal line of an end surface of the second adsorption element (82) lie in a straight line.

In the sixth problem-solving means, the first and second operations are performed switchably by changing the route of flows of the first air and the second air.

In the seventh problem-solving means, at the time of switching between the first operation and the second operation, the opening/closing mechanism (140, . . . ) is operated. The opening/closing mechanism (140, . . . ) opens and closes the air flow paths through which the first air and the second air flow at predetermined points of the air flow paths. And, the route of flows of the first air and the second air is changed, only by opening and closing the air flow paths with the opening/closing mechanism (71, . . . , 140, . . . ) without having to move the adsorption elements (81, 82).

In the eighth problem-solving means, at the time of switching between the first operation and the second operation, the opening/closing mechanism (71, . . . ) is operated and, at the same time, the adsorption elements (81, 82) are rotated. The opening/closing mechanism (71, . . . ) opens and closes the air flow paths through which the first air and the second air flow at predetermined points of the air flow paths. In addition, when the adsorption elements (81, 82) are rotated, the air flow paths to which the humidity adjusting side passageway (85) and the cooling side passageway (86) open are changed. And, the route of flows of the first air and the second air is changed by opening and closing the air flow paths with the opening/closing mechanism (71, . . . ) and causing the adsorption elements (81, 82) to rotate.

In the ninth problem-solving means, the adsorption element (150) is shaped like a doughnut. Furthermore, in the adsorption element (150) plural humidity adjusting side passageways (85) and plural cooling side passageways (86) are formed in an alternating arrangement in its circumferential direction. The adsorption element (150) is rotationally driven, during which the first air flows through some of the humidity adjusting side passageways (85) and the second air flows through the remaining humidity adjusting side passageways (85).

EFFECTS

In the present invention, the adsorbent of the adsorption element (81, 82, 150) is regenerated by making use of the second air heated in the condenser (92) of the refrigerant circuit. Here, in a refrigeration cycle of the refrigerant circuit, refrigerant which has absorbed heat from the first air in the evaporator (93, 94) liberates the heat to the second air in the condenser (92). And, the amount of heat that is given to the second air in the condenser (92) becomes greater than the energy required to drive the compressor (91). Accordingly, in accordance with the present invention the second air is heated by the refrigeration cycle of the refrigerant circuit, thereby making it possible to obtain a dehumidification power exceeding the energy required for refrigeration cycles. As a result, the energy efficiency of an air conditioning apparatus which performs air humidity adjustment is improved and energy costs required for air humidity adjustment operations are cut down.

BRIEF DESCRIPTION OF DRAWINGS

FIG. 5 is an exploded perspective view describing a first operation during the dehumidification operating mode of the air conditioning apparatus according to the first embodiment;

FIG. 6 is an exploded perspective view describing a second operation during the dehumidification operating mode of the air conditioning apparatus according to the first embodiment;

FIG. 8 is an exploded perspective view describing a second operation during the humidification operating mode of the air conditioning apparatus according to the first embodiment;

BEST MODE FOR CARRYING OUT INVENTION

Figure 1:
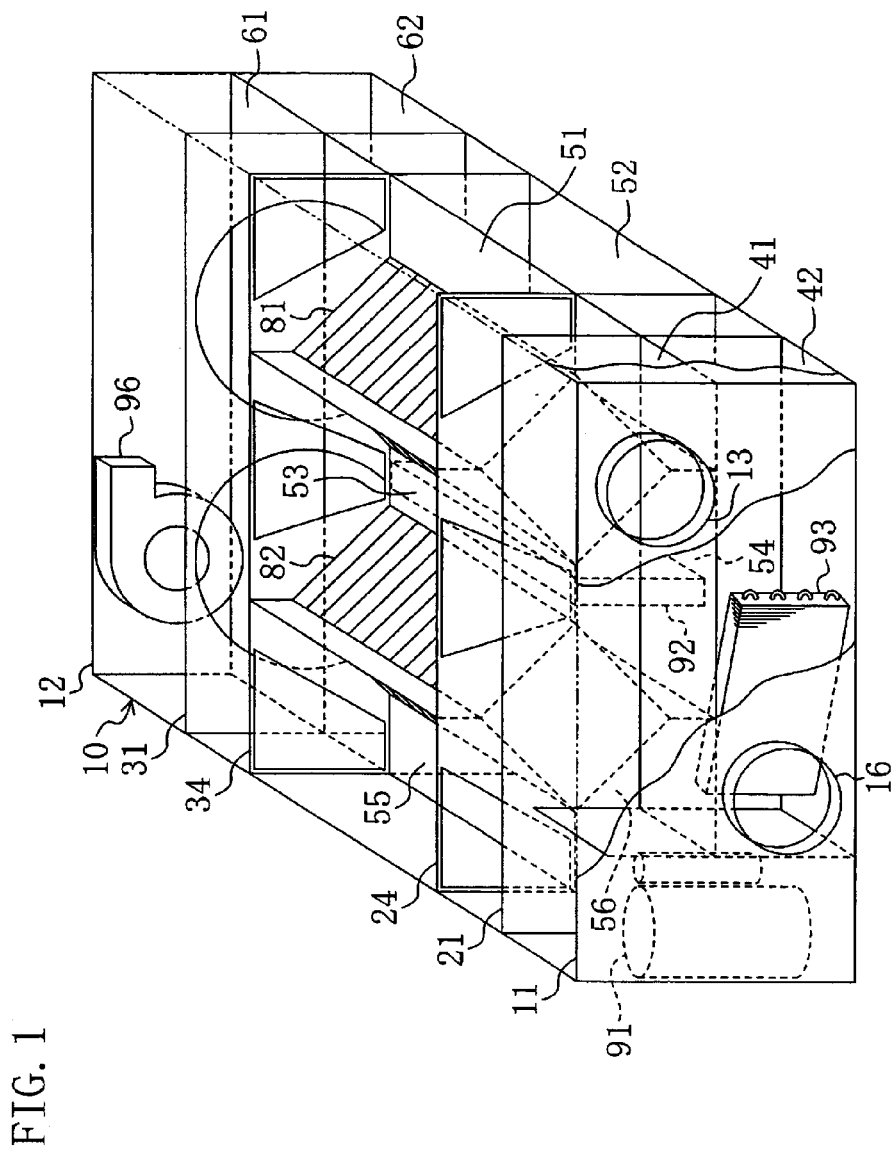
FIG. 1 is a schematic perspective view showing an arrangement of an air conditioning apparatus according to a first embodiment of the present invention.

Hereinafter, embodiments of the present invention will be described in detail with reference to the drawings. In addition, the positional terms "upper", "lower", "left", "right", "front", "rear", "front side (near side)", and "rear side (far side)" mean "upper", "lower", "left", "right", "front", "rear", "front side (near side)", and "rear side (far side)" positions respectively in the drawings referred to in the following description.

FIRST EMBODIMENT OF INVENTION

An air conditioning apparatus according to a first embodiment of the present invention is so constructed as to operate switchably between a dehumidification operating mode in which outside air dehumidified and cooled is supplied indoors and a humidification operating mode in which outside air heated and humidified is supplied indoors. Furthermore, the air conditioning apparatus is provided with two adsorption elements (81, 82) and is so constructed as to perform a so-called batch system operation. Here, an arrangement of the air conditioning apparatus of the first embodiment will be described with reference to FIGS. 1–5.

As shown in FIGS. 1 and 5, the air conditioning apparatus has a somewhat flat, rectangular parallelepiped casing (10). The casing (10) houses, in addition to the two adsorption elements (81, 82), four rotary dampers (71, 72, 73, 74) and a single refrigerant circuit. Diagrammatic representation of the rotary damper (71–74) is omitted in FIG. 1.

Figure 2:
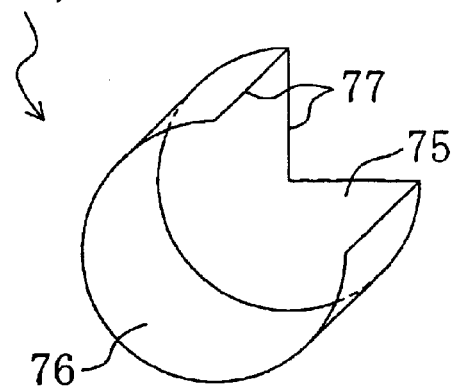
FIG. 2 is a schematic perspective view showing a rotary damper of the air conditioning apparatus according to the first embodiment.

As shown in FIG. 2, the rotary damper (71–74) comprises an end surface portion (75) shaped like a circular disc and a peripheral side portion (76) extending perpendicularly from an outer periphery of the end surface portion (75). The end surface portion (75) is notched, at its part, into a fan shape the central angle of which is 90 degrees. In addition, a corresponding part of the peripheral side portion (76) to the notched part of the end surface portion (75) is also notched. The notched part of the end surface portion (75) and the notched part of the peripheral side portion (76) together form a notched opening (77) of the rotary damper (71–74). The rotary damper (71–74) is formed rotatably around an axis passing through the center of the end surface portion (75). And, the rotary damper (71–74) constitutes a switching mechanism for opening and closing an air flow path.

Figure 3:
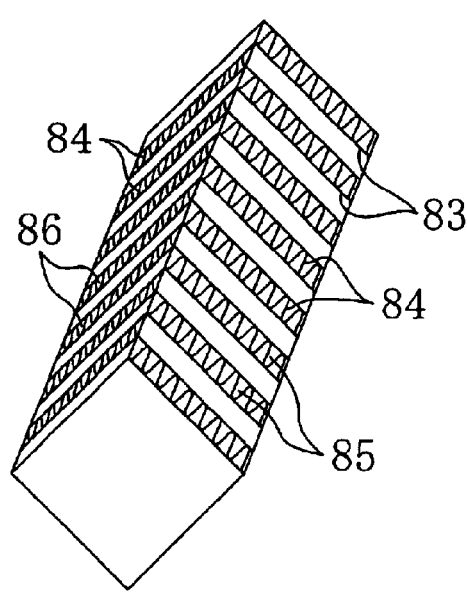
FIG. 3 is a schematic perspective view showing an adsorption element of the air conditioning apparatus according to the first embodiment.

As shown in FIG. 3, the adsorption element (81, 82) comprises alternating laminations of square-shaped flat plate members (83) and square-shaped corrugated plate members (84). These corrugated plate members (84) are laminated in such orientation that each corrugated plate member (84) is out of alignment in ridgeline direction by an angle of 90 degrees from its neighboring corrugated plate member (84). And, the adsorption element (81, 82) is formed into a square column shape. In other words, each of end surfaces of the adsorption element (81, 82) is formed into the same square shape as the flat plate member (83).

In the adsorption element (81, 82), humidity adjusting side passageways (85) and cooling side passageways (86) are divisionally formed in alternation in the direction in which the flat plate members (83) and the corrugated plate members (84) are laminated, facing each other across the respective flat plate members (83). The humidity adjusting side passageway (85) opens in a pair of opposite side surfaces of the adsorption element (81, 82), while the cooling side passageway (86) opens in another pair of opposite side surfaces of the adsorption element (81, 82). Surfaces of the flat plate members (83) that face the humidity adjusting side passageways (85) and surfaces of the corrugated plate members (84) disposed in the humidity adjusting side passageways (85) are coated with an adsorbent capable of adsorbing water vapor. As the adsorbent, silica gel, zeolite, ion exchange resin, et cetera may be used.

The refrigerant circuit mentioned above is a closed circuit formed by piping connection of a compressor (91), a regenerative heat exchanger (92) which operates as a condenser, an expansion valve which operates as an expansion mechanism, a first cooling heat exchanger (93) which operates as an evaporator, and a second cooling heat exchanger (94) which operates as an evaporator. Diagrammatic representation of the entire arrangement of the refrigerant circuit and the expansion valve is omitted. The refrigerant circuit is so constructed as to perform a vapor compression refrigeration cycle by circulating charged refrigerant. Furthermore, the first cooling heat exchanger (93) and the second cooling heat exchanger (94) are connected in parallel in the refrigerant circuit. And, the refrigerant circuit is so constructed as to operate switchably between an operation in which only the first cooling heat exchanger (93) serves as an evaporator with no introduction of refrigerant into the second cooling heat exchanger (94), and an operation in which only the second cooling heat exchanger (94) operates as an evaporator with no introduction of refrigerant into the first cooling heat exchanger (93).

As shown in FIGS. 1 and 5, the casing (10) is provided with an outdoor side panel (11) which is a nearest side panel, and an indoor side panel (12) which is a farthest side panel. An air supply side inlet (13) is formed in an upper-right corner of the outdoor side panel (11). An air discharge side outlet (16) is formed to the bottom left of the outdoor side panel (11). On the other hand, an air supply side outlet (14) is formed in a lower-right corner of the indoor side panel (12), and an air discharge side inlet (15) is formed in an upper-left corner of the indoor side panel (12).

Housed in the casing (10) are four partition plates (21, 24, 34, 31). These partition plates (21, 24, 34, 31) are standingly arranged in that order from near to far side, dividing an interior space of the casing (10) in a cross direction. In addition, each of these internal spaces of the casing (10) divided by the partition plates (21, 24, 34, 31) is further divided into an upper space and a lower space.

Divisionally formed between the outdoor side panel (11) and the first partition plate (21) are an upper-situated, first upper flow path (41) and a lower-situated, first lower flow path (42). The first upper flow path (41) communicates with an outdoor space through the air supply side inlet (13). The first lower flow path (42) communicates with an outdoor space through the air discharge side outlet (16). The first cooling heat exchanger (93) is disposed in the first lower flow path (42). In addition, the compressor (90) is disposed to the left of a space between the outdoor side panel (11) and the first partition panel (21).

The two rotary dampers (71, 72) are arranged, in a lateral row, between the first partition plate (21) and the second partition plate (24). More specifically, the first rotary damper (71) is disposed to the right and the second rotary damper (72) is disposed to the left. The rotary dampers (71, 72) are disposed in such orientation that their respective end surface portions (75) face in the direction of the second partition plate (24). In addition, the rotary dampers (71, 72) are arranged such that they rotate while being in contact with both the first partition plate (21) and the second partition plate (24).

The space between the first partition plate (21) and the second partition plate (24) is divided into an upper space and a lower space. Each of the upper and lower spaces is further divided, by the first and second rotary dampers (71, 72), into three sections. Divisionally formed on the right side of the first rotary damper (71) are an upper-situated, second upper-right flow path (43) and a lower-situated, second lower-right flow path (44). Divisionally formed between the first rotary damper (71) and the second rotary damper (72) are an upper-situated, second upper-central flow path (45) and a lower-situated, second lower-central flow path (46). Further, divisionally formed on the left side of the second rotary damper (72) are an upper-situated, second upper-left flow path (47) and a lower-situated, second lower-left flow path (48).

The first partition plate (21) is provided with the following two openings. The first right side opening (22) which opens on the right side is a circular opening formed at a position corresponding to the first rotary damper (71). The first left side opening (23) which opens on the left side is a circular opening formed at a position corresponding to the second rotary damper (72). The first right side opening (22) and the first left side opening (23) are each provided with an opening/closing shutter. The operation of the opening/closing shutters enables the first right side opening (22) and the first left side opening (23) to switch between a state in which only an upper half of the opening area is placed in the open state, and a state in which only a lower half of the opening area is placed in the open state. Each opening/closing shutter constitutes an opening/closing mechanism.

The two adsorption elements (81, 82) are arranged, in a lateral row, between the second partition plate (24) and the third partition plate (34). More specifically, the first adsorption element (81) is disposed to the right and the second adsorption element (82) is disposed to the left. These adsorption elements (81, 82) are arranged in parallel in such orientation that their respective longitudinal directions correspond to the longitudinal direction of the casing (10). In addition, as shown in FIG. 4, the adsorption elements (81, 82) are disposed in such orientation that their end surfaces each form a rhombic shape such as a square shape rotated an angle of 45 degrees. In other words, the adsorption elements (81, 82) are disposed in such orientation that one end-surface diagonal line of the adsorption element (81) and its corresponding end-surface diagonal line of the adsorption element (82) are arranged in a straight line. Furthermore, each of the adsorption elements (81, 82) is formed rotatably on an axis passing through its end-surface center.

The space between the second partition plate (24) and the third partition plate (34) is divided into an upper space and a lower space. Each of the upper and lower spaces is further divided, by the first and second adsorption elements (81, 82), into three sections. In other words, divisionally formed on the right side of the first adsorption element (81) are an upper-situated, third upper-right flow path (51) and a lower-situated, third lower-right flow path (52). An upper-situated, third upper-central flow path (53) and a lower-situated, third lower-central flow path (54) are divisionally formed between the first adsorption element (81) and the second adsorption element (82). Divisionally formed on the left side of the second adsorption element (82) are an upper-situated, third upper-left flow path (55) and a lower-situated, third lower-left flow path (56). In addition, the third lower-central flow path (54) constitutes an air flow path for regeneration. The regenerative heat exchanger (92) of the refrigerant circuit is disposed in such orientation that it crosses the third lower-central flow path (54).

The second partition plate (24) is provided with the following five openings. The second upper-right opening (25) opening in an upper-right corner of the second partition plate (24) establishes communication between the second upper-right flow path (43) and the third upper-right flow path (51). The second lower-right opening (26) opening at a lower-right corner establishes communication between the second lower-right flow path (44) and the third lower-right flow path (52). The second central opening (27) opening in an upper center establishes communication between the second upper-central flow path (45) and the third upper-central flow path (53). The second upper-left opening (28) opening at an upper-left corner establishes communication between the second upper-left flow path (47) and the third upper-left flow path (55). Finally, the second lower-left opening (29) opening at a lower-left corner establishes communication between the second lower-left flow path (48) and the third lower-left flow path (56).

The second upper-right opening (25), the second lower-right opening (26), the second central opening (27), the second upper-left opening (28), and the second lower-left opening (29) are each provided with an opening/closing shutter. The operation of the opening/closing shutters enables the second upper-right opening (25), the second lower-right opening (26), the second central opening (27), the second upper-left opening (28), and the second lower-left opening (29) to switch between a communicating state and a shut-off state. Each opening/closing shutter constitutes an opening/closing mechanism.

The two rotary dampers (73, 74) are arranged, in a lateral row, between the third partition plate (34) and the fourth partition plate (31). More specifically, the third rotary damper (73) is disposed to the right and the fourth rotary damper (74) is disposed to the left. The rotational dampers (73, 74) are disposed in such orientation that their respective end surface portions (75) face in the direction of the third partition plate (34). In addition, the rotary dampers (73, 74) are arranged such that they rotate while being in contact with both the third partition plate (34) and the fourth partition plate (31).

The space between the third partition plate (34) and the fourth partition plate (31) is divided into an upper space and a lower space. Each of the upper and lower spaces is further divided, by the third and fourth rotary dampers (73, 74), into three sections. In other words, divisionally formed on the right side of the third rotary damper (73) are an upper-situated, fourth upper-right flow path (63) and a lower-situated, fourth lower-right flow path (64). An upper-situated, fourth upper-central flow path (65) and a lower-situated, fourth lower-central flow path (66) are divisionally formed between the third rotary damper (73) and the fourth rotary damper (74). Divisionally formed on the left side of the fourth rotary damper (74) are an upper-situated, fourth upper-left flow path (67) and a lower-situated, fourth lower-left flow path (68).

The third partition plate (34) is provided with the following five openings. The third upper-right opening (35) opening in au upper-right corner of the third partition plate (34) establishes communication between the third upper-right flow path (51) and the fourth upper-right flow path (63). The third lower-right opening (36) opening at a lower-right corner establishes communication between the third lower-right flow path (52) and the fourth lower-right flow path (64). The third central opening (37) opening in an upper central portion establishes communication between the third upper-central flow path (53) and the fourth upper-central flow path (65). The third upper-left opening (38) opening in an upper-left corner establishes communication between the third upper-left flow path (55) and the fourth upper-left flow path (67). Finally, the third lower-left opening (39) opening in a lower-left corner establishes communication between the third lower-left flow path (56) and the fourth lower-left flow path (68).

The third upper-right opening (35), the third lower-right opening (36), the third central opening (37), the third upper-left opening (38), and the third lower-left opening (39) are each provided with an opening/closing shutter. The operation of the opening/closing shutters enables the third upper-right opening (35), the third lower-right opening (36), the third central opening (37), the third upper-left opening (38), and the third lower-left opening (39) to switch between a communicating state and a shut-off state. Each opening/closing shutter constitutes an opening/closing mechanism.

The fourth partition plate (31) is provided with the following two openings. The fourth right side opening (32)

opening on the right side is a circular opening which is formed at a position corresponding to the third rotary damper (73). The fourth left side opening (33) opening on the left side is a circular opening which is formed at a position corresponding to the fourth rotary damper (74). The fourth right side opening (32) and the fourth left side opening (33) are each provided with an opening/closing shutter. The operation of the opening/closing shutters enables the fourth right side opening (32) and the fourth left side opening (33) to switch between a state in which only an upper half of the opening area is placed in the open state, and a state in which only a lower half of the opening area is placed in the open state. Each opening/closing shutter constitutes an opening/closing mechanism.

Divisionally formed between the fourth partition plate (31) and the indoor side panel (12) are an upper-situated, fifth upper flow path (61) and a lower-situated, fifth lower flow path (62). The fifth upper flow path (61) is brought into communication with an indoor space by the air discharge side inlet (15). The fifth upper flow path (61) is provided with an air discharge fan (96). On the other hand, the fifth lower flow path (62) is brought into communication with an indoor space by the air supply side outlet (14). The fifth lower flow path (62) is provided with an air supply fan (95) and a second cooling heat exchanger (94).

Running Operation

Referring to FIGS. 4–8, the running operation of the above-described air conditioning apparatus will be described. FIG. 4 typically shows portions between the second partition plate (24) and the third partition plate (34) within the casing (10).

Dehumidification Operating Mode

As shown in FIGS. 5 and 6, when the air supply fan (95) is activated in the dehumidification operating mode, outdoor air is taken into the inside of the casing (10) through the air supply side inlet (13). The outdoor air flows, as first air, into the first upper flow path (41). On the other hand, when the air discharge fan (96) is activated, indoor air is taken into the inside of the casing (10) through the air discharge side inlet (15). The indoor air flows, as second air, into the fifth upper flow path (61).

Furthermore, during the dehumidification operating mode, refrigeration cycles are carried out in the refrigerant circuit, in which the regenerative heat exchanger (92) operates as a condenser and the second cooling heat exchanger (94) operates as an evaporator. Stated another way, no refrigerant flows in the first cooling heat exchanger (93) in the dehumidification operating mode. And, the dehumidification operating mode of the air conditioning apparatus is performed by repeating first and second operations in alternation.

Referring to FIG. 5, the first operation of the dehumidification operating mode will be described. In the first operation, a dehumidifying operation and a regenerating operation are performed. During the first operation, air is dehumidified by the first adsorption element (81) and, at the same time, the adsorbent of the second adsorption element (82) is regenerated.

In addition, in the first operation the second upper-right opening (25), the second central opening (27), and the second lower-left opening (29) are placed in the closed state in the second partition plate (24). Furthermore, the third lower-right opening (36), the third upper-left opening (38), and the third lower-left opening (39) are placed in the closed state in the third partition plate (34).

An upper half portion of the first right side opening (22) is in the open state. The notched opening (77) of the first rotary damper (71) is oriented such that it is located at the lower-right position and opens to the second lower-right flow path (44). The second lower-right opening (26) of the second partition plate (24) is in the communicating state. In this state, the first air, which has flowed into the first upper flow path (41), passes through the first right side opening (22), the inside of the first rotary damper (71), the second lower-right flow path (44), and the second lower-right opening (26) in that order, and flows into the third lower-right flow path (52).

An upper half portion of the fourth right side opening (32) is in the open state. The notched opening (77) of the third rotary damper (73) is oriented such that it is located at the upper-right position and opens to the fourth upper-right flow path (63). The third upper-right opening (35) of the third partition plate (34) is in the communicating state. In this state, the second air, which has flowed into the fifth upper flow path (61), passes through the fourth right side opening (32), the inside of the third rotary damper (73), the fourth upper-right flow path (63), and the third upper-right opening (35) in that order, and flows into the third upper-right flow path (51).

The humidity adjusting side passageway (85) of the first adsorption element (81) is in communication with the third lower-right flow path (52) as well as with the third upper-central flow path (53). The cooling side passageway (86) of the first adsorption element (81) is in communication with the third upper-right flow path (51) as well as with the third lower-central flow path (54). On the other hand, the humidity adjusting side passageway (85) of the second adsorption element (82) is in communication with the third lower-central flow path (54) as well as with the third upper-left flow path (55). The cooling side passageway (86) of the second adsorption element (82) is in communication with the third upper-central flow path (53) as well as with the third lower-left flow path (56).

Figure 4A:
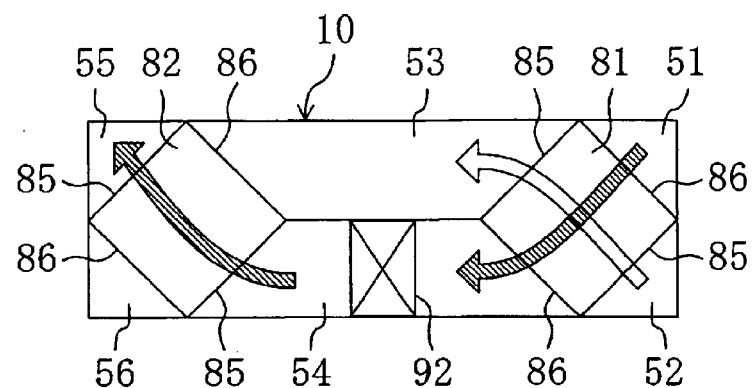
FIG. 4 is a diagram typically showing a principal part of the air conditioning apparatus according to the first embodiment.

As also shown in FIG. 4(a), in this state the first air flows into the humidity adjusting side passageway (85) of the first adsorption element (81) from the third lower-right flow path (52). During the flow through the humidity adjusting side passageway (85), water vapor contained in the first air is adsorbed into the adsorbent. The first air dehumidified in the humidity adjusting side passageway (85) flows into the third upper-central flow path (53).

On the other hand, the second air flows into the cooling side passageway (86) of the first adsorption element (81) from the third upper-right flow path (51). During the flow through the cooling side passageway (86), the second air absorbs heat of adsorption generated when water vapor is adsorbed into the adsorbent in the humidity adjusting side passageway (85). The second air, which has robbed heat of adsorption, flows into the third lower-central flow path (54). During the flow through the third lower-central flow path (54), the second air passes through the regenerative heat exchanger (92). In the regenerative heat exchanger (92), the second air is subjected to heat exchange with refrigerant and absorbs heat of condensation of the refrigerant.

The second air heated by the first adsorption element (81) and the regenerative heat exchanger (92) is introduced into the humidity adjusting side passageway (85) of the second adsorption element (82). In the humidity adjusting side passageway (85) the adsorbent is heated by the second air and, as a result, water vapor is desorbed from the adsorbent. In other words, the adsorbent is regenerated. Then, the water vapor desorbed from the adsorbent flows, together with the second air, into the third upper-left flow path (55).

The third central opening (37) of the third partition plate (34) is in the communicating state. The notched opening

(77) of the fourth rotary damper (74) is oriented such that it is located at the upper-right position and opens to the fourth upper-central flow path (65). A lower half portion of the fourth left side opening (33) is in the open state. In this state, the first air dehumidified by the first adsorption element (81) passes through the third upper-central flow path (53), the third central opening (37), the fourth upper-central flow path (65), the inside of the fourth rotary damper (74), and the fourth left side opening (33) in that order, and flows into the fifth lower flow path (62).

During the flow through the fifth lower flow path (62), the first air passes through the second cooling heat exchanger (94). In the second cooling heat exchanger (94) the first air is subjected to heat exchange with refrigerant and liberates heat to the refrigerant. And, the first air dehumidified and cooled passes through the air supply side outlet (14) and is supplied indoors.

The second upper-left opening (28) of the second partition plate (24) is in the communicating state. The notched opening (77) of the second rotary damper (72) is oriented such that it is located at the upper-left position and opens to the second upper-left flow path (47). A lower half portion of the first left side opening (23) is in the open state. In this state, the second air, which has flowed out of the second adsorption element (82), passes through the third upper-left flow path (55), the second upper-left opening (28), the second upper-left flow path (47), the inside of the second rotary damper (72), and the first left side opening (23) in that order, and flows into the first lower flow path (42).

During the flow through the first lower flow path (42), the second air passes through the first cooling heat exchanger (93). At this time, no refrigerant flows through the first cooling heat exchanger (93). Accordingly, the second air just passes through the first cooling heat exchanger (93) and, therefore, neither absorbs nor liberates heat. Thereafter, the second air passes through the air discharge side outlet (16) and is discharged outdoors.

Referring to FIG. 6, the second operation of the dehumidification operating mode will be described. In the second operation, a dehumidifying operation and a regenerating operation are performed. Contrary to the first operation, in the second operation air is dehumidified in the second adsorption element (82) and, at the same time, the adsorbent of the first adsorption element (81) is regenerated.

In addition, in the second operation the second lower-right opening (26), the second central opening (27), and the second upper-left opening (28) are closed in the second partition plate (24). Furthermore, the third upper-right opening (35), the third lower-right opening (36), and the third lower-left opening (39) are closed in the third partition plate (34).

An upper half portion of the first left side opening (23) is in the open state. The notched opening (77) of the second rotary damper (72) is oriented such that it is located at the lower-left position and opens to the second lower-left flow path (48). The second lower-left opening (29) of the second partition plate (24) is in the communicating state. In this communicating state, the first air, which has flowed into the first upper flow path (41), passes through the first left side opening (23), the inside of the second rotary damper (72), the second lower-left flow path (48), and the second lower-left opening (29) in that order, and flows into the third lower-left flow path (56).

An upper half portion of the fourth left side opening (33) is in the open state. The notched opening (77) of the fourth rotary damper (74) is oriented such that it is located at the upper-left position and opens to the fourth upper-left flow path (67). The third upper-left opening (38) of the third partition plate (34) is in the communicating state. In this communicating state, the second air, which has flowed into the fifth upper flow path (61), passes through the fourth left side opening (33), the inside of the fourth rotary damper (74), the fourth upper-left flow path (67), and the third upper-left opening (38) in that order, and flows into the third upper-left flow path (55).

At the time of switching from the first operation to the second operation, the first adsorption element (81) and the second adsorption element (82) are rotated by an angle of 90 degrees (see FIG. 4($b$)). And, the humidity adjusting side passageway (85) of the second adsorption element (82) is in communication with the third lower-left flow path (56) as well as with the third upper-central flow path (53). The cooling side passageway (86) of the second adsorption element (82) is in communication with the third upper-left flow path (55) as well as with the third lower-central flow path (54). In addition, the humidity adjusting side passageway (85) of the first adsorption element (81) is in communication with the third lower-central flow path (54) as well as with the third upper-right flow path (51). The cooling side passageway (86) of the first adsorption element (81) is in communication with the third upper-central flow path (53) as well as with the third lower-right flow path (52).

As also shown in FIG. 4($c$), in this state the first air flows into the humidity adjusting side passageway (85) of the second adsorption element (82) from the third lower-left flow path (56). During the flow through the humidity adjusting side passageway (85), water vapor contained in the first air is adsorbed into the adsorbent. The first air humidified in the humidity adjusting side passageway (85) flows into the third upper-central flow path (53).

On the other hand, the second air flows into the cooling side passageway (86) of the second adsorption element (82) from the third upper-left flow path (55). During the flow through the cooling side passageway (86), the second air absorbs heat of adsorption generated when water vapor is adsorbed into the adsorbent in the humidity adjusting side passageway (85). The second air, which has robbed heat of adsorption, flows into the third lower-central flow path (54). During the flow through the third lower-central flow path (54), the second air passes through the regenerative heat exchanger (92). In the regenerative heat exchanger (92), the second air is subjected to heat exchange with refrigerant and absorbs heat of condensation of the refrigerant.

The second air heated in the second adsorption element (82) and the regenerative heat exchanger (92) is introduced into the humidity adjusting side passageway (85) of the first adsorption element (81). In the humidity adjusting side passageway (85) the adsorbent is heated by the second air and, as a result, water vapor is desorbed from the adsorbent. In other words, the adsorbent is regenerated. The water vapor desorbed from the adsorbent flows, together with the second air, into the third upper-right flow path (51).

The third central opening (37) of the third partition plate (34) is in the communicating state. The notched opening (77) of the third rotary damper (73) is oriented such that it is located at the upper-left position and opens to the fourth upper-central flow path (65). A lower half portion of the fourth right side opening (32) is in the open state. In this state, the first air dehumidified by the second adsorption element (82) passes through the third upper-central flow path (53), the third central opening (37), the fourth upper-central flow path (65), the inside of the third rotary damper (73), and the fourth right side opening (32) in that order, and flows into the fifth lower flow path (62).

During the flow through the fifth lower flow path (62), the first air passes through the second cooling heat exchanger (94). In the second cooling heat exchanger (94) the first air is subjected to heat exchange with refrigerant and liberates heat to the refrigerant. And the first air dehumidified and cooled passes through the air supply side outlet (14) and is supplied indoors.

The second upper-right opening (25) of the second partition plate (24) is in the communicating state. The notched opening (77) of the first rotary damper (71) is oriented such that it is located at the upper-right position and opens to the second upper-right flow path (43). A lower half portion of the first right side opening (22) is in the open state. In this state, the second air, which has flowed out of the first adsorption element (81), passes through the third upper-right flow path (51), the second upper-right opening (25), the second upper-right flow path (43), the inside of the first rotary damper (71), and the first right side opening (22) in that order, and flows into the first lower flow path (42).

During the flow through the first lower flow path (42), the second air passes through the first cooling heat exchanger (93). At this time, no refrigerant flows in the first cooling heat exchanger (93). Accordingly, the second air just passes through the first cooling heat exchanger (93) and, therefore, neither absorbs nor liberates heat. Thereafter, the second air passes through the air discharge side outlet (16) and is discharged outdoors.

Humidification Operating Mode

Figure 7:
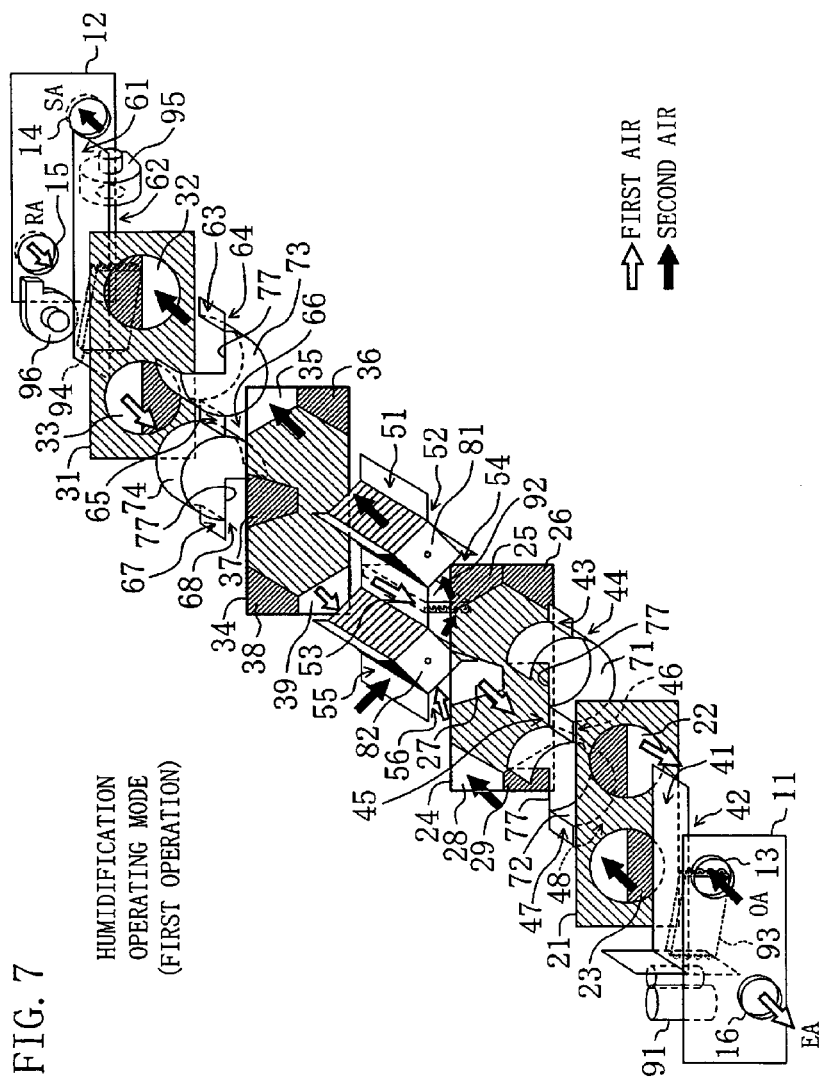
FIG. 7 is an exploded perspective view describing a first operation during the humidification operating mode of the air conditioning apparatus according to the first embodiment.

As shown in FIGS. 7 and 8, when the air supply fan (95) is activated in the humidification operating mode, outdoor air is taken into the inside of the casing (10) through the air supply side inlet (13). The outdoor air flows, as second air, into the first upper flow path (41). On the other hand, when the air discharge fan (96) is activated, indoor air is taken into the inside of the casing (10) through the air discharge side inlet (15). The indoor air flows, as first air, into the fifth upper flow path (61).

Furthermore, in the humidification operating mode, refrigeration cycles are carried out in the refrigerant circuit, in which the regenerative heat exchanger (92) operates as a condenser and the first cooling heat exchanger (93) operates as an evaporator. Stated another way, no refrigerant flows in the second cooling heat exchanger (94) in the humidification operating mode. And, the humidification operating mode of the air conditioning apparatus is performed by repeating first and second operations in alternation.

Referring to FIG. 7, the first operation of the humidification operating mode will be described. In the first operation, a dehumidifying operation and a regenerating operation are performed. In the first operation, air is humidified by the first adsorption element (81) and the adsorbent of the second adsorption element (82) adsorbs water vapor.

In addition, in the first operation the second upper-right opening (25), the second lower-right opening (26), and the second lower-left opening (29) are closed in the second partition plate (24). Furthermore, the third lower-right opening (36), the third central opening (37), and the third upper-left opening (38) are closed in the third partition plate (34).

An upper half portion of the first left side opening (23) is in the open state. The notched opening (77) of the second rotary damper (72) is oriented such that it is located at the upper-left position and opens to the second upper-left flow path (47). The second upper-left opening (28) of the second partition plate (24) is in the communicating state. In this state, the second air, which has flowed into the first upper flow path (41), passes through the first left side opening (23), the inside of the second rotary damper (72), the second upper-left flow path (47), and the second upper-left opening (28) in that order, and flows into the third upper-left flow path (55).

An upper half portion of the fourth left side opening (33) is in the open state. The notched opening (77) of the fourth rotary damper (74) is oriented such that it is located at the lower-left position and opens to the fourth lower-left flow path (68). The third lower-left opening (39) of the third partition plate (34) is in the communicating state. In this state, the first air, which has flowed into the fifth upper flow path (61), passes through the fourth left side opening (33), the inside of the fourth rotary damper (74), the fourth lower-left flow path (68), and the third lower-left opening (39) in that order, and flows into the third lower-left flow path (56).

The humidity adjusting side passageway (85) of the second adsorption element (82) is in communication with the third lower-left flow path (56) as well as with the third upper-central flow path (53). The cooling side passageway (86) of the second adsorption element (82) is in communication with the third upper-left flow path (55) as well as with the third lower-central flow path (54). In addition, the humidity adjusting side passageway (85) of the first adsorption element (81) is in communication with the third lower-central flow path (54) as well as with the third upper-right flow path (51). The cooling side passageway (86) of the first adsorption element (81) is in communication with the third upper-central flow path (53) as well as with the third lower-right flow path (52).

Figure 4B:
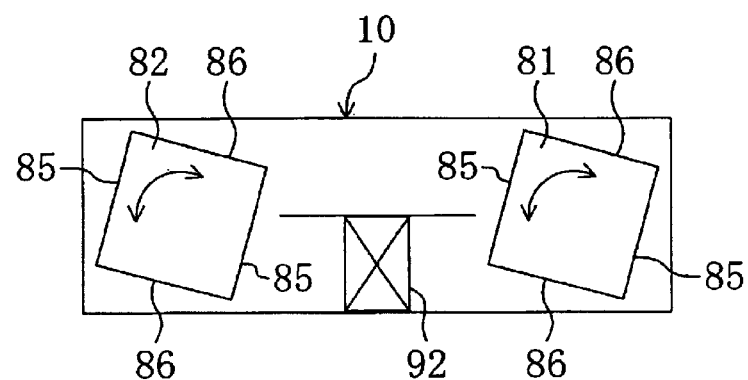
Figure 4C:
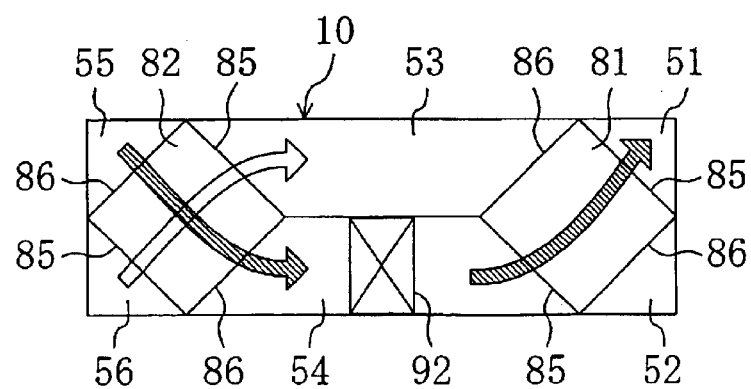

As also shown in FIG. 4(c), in this state the first air flows into the humidity adjusting side passageway (85) of the second adsorption element (82) from the third lower-left flow path (56). During the flow through the humidity adjusting side passageway (85), water vapor contained in the first air is adsorbed into the adsorbent. The first air dehumidified by the humidity adjusting side passageway (85) flows into the third upper-central flow path (53).

On the other hand, the second air flows into the cooling side passageway (86) of the second adsorption element (82) from the third upper-left flow path (55). During the flow through the cooling side passageway (86), the second air absorbs heat of adsorption generated when water vapor is adsorbed into the adsorbent in the humidity adjusting side passageway (85). The second air, which has robbed heat of adsorption, flows into the third lower-central flow path (54). During the flow through the third lower-central flow path (54), the second air passes through the regenerative heat exchanger (92). In the regenerative heat exchanger (92) the second air is subjected to heat exchange with refrigerant and absorbs heat of condensation of the refrigerant.

The second air heated by the second adsorption element (82) and the regenerative heat exchanger (92) is introduced into the humidity adjusting side passageway (85) of the first adsorption element (81). In the humidity adjusting side passageway (85) the adsorbent is heated by the second air and, as a result, water vapor is desorbed from the adsorbent. In other words, the adsorbent is regenerated. And, the water vapor desorbed from the adsorbent is given to the second air and, as a result, the second air is humidified. The second air humidified in the first adsorption element (81) flows into the third upper-right flow path (51).

The third upper-right opening (35) of the third partition plate (34) is in the communicating state. The notched opening (77) of the third rotary damper (73) is oriented such that it is located at the upper-right position and opens to the fourth upper-right flow path (63). A lower half portion of the fourth right side opening (32) is in the open state. In this state, the second air humidified by the first adsorption element (81) passes through the third upper-right flow path (51), the third upper-right opening (35), the fourth upper-right flow path (63), the inside of the third rotary damper (73), and the fourth right side opening (32) in that order, and flows into the fifth lower flow path (62).

During the flow through the fifth lower flow path (62), the second air passes through the second cooling heat exchanger (94). At this time, no refrigerant is flowing in the second cooling heat exchanger (94). Accordingly, the second air just passes through the second cooling heat exchanger (94) and, therefore, neither absorbs nor liberates heat. And, the second air heated and humidified passes through the air supply side outlet (14) and is supplied indoors.

The second central opening (27) of the second partition plate (24) is in the communicating state. The notched opening (77) of the first rotary damper (71) is oriented such that it is located at the upper-left position and opens to the second upper-central flow path (45). A lower half portion of the first right side opening (22) is in the open state. In this state, the first air dehumidified in the second adsorption element (82) passes through the third upper-central flow path (53), the second central opening (27), the second upper-central flow path (45), the inside of the first rotary damper (71), and the first right side opening (22) in that order, and flows into the first lower flow path (42).

During the flow through the first lower flow path (42), the first air passes through the first cooling heat exchanger (93). The first air is subjected to heat exchange with refrigerant in the first cooling heat exchanger (93) and the refrigerant in the refrigerant circuit absorbs heat from the first air and evaporates. Thereafter, the first air passes through the air discharge side outlet (16) and is discharged outdoors.

Referring to FIG. 8, the second operation of the humidification operating mode will be described. In the second operation, a dehumidifying operation and a regenerating operation are performed. Contrary to the first operation, in the second operation air is humidified in the second adsorption element (82) and the adsorbent of the first adsorption element (81) adsorbs water vapor.

In addition, in the second operation the second lower-right opening (26), the second upper-left opening (28), and the second lower-left opening (29) are closed in the second partition plate (24). Furthermore, the third upper-right opening (35), the third central opening (37), and the third lower-left opening (39) are closed in the third partition plate (34).

An upper half portion of the first right side opening (22) is in the open state. The notched opening (77) of the first rotary damper (71) is oriented such that it is located at the upper-right position and opens to the second upper-right flow path (43). The second upper-right opening (25) of the second partition plate (24) is in the communicating state. In this state, the second air, which has flowed into the first upper flow path (41), passes through the first right side opening (22), the inside of the first rotary damper (71), the second upper-right flow path (43), and the second upper-right opening (25) in that order, and flows into the third upper-right flow path (51).

An upper half portion of the fourth right side opening (32) is in the open state. The notched opening (77) of the third rotary damper (73) is oriented such that it is located at the lower-right position and opens to the fourth lower-right flow path (64). The third lower-right opening (36) of the third partition plate (34) is in the communicating state. In this state, the first air, which has flowed into the fifth upper flow path (61), passes through the fourth right side opening (32), the inside of the third rotary damper (73), the fourth lower-right flow path (64), and the third lower-right opening (36) in that order, and flows into the third lower-right flow path (52).

At the time of switching from the first operation to the second operation, the first adsorption element (81) and the second adsorption element (82) are rotated by an angle of 90 degrees (see FIG. 4(b)). And, the humidity adjusting side passageway (85) of the first adsorption element (81) is in communication with the third lower-right flow path (52) as well as with the third upper-central flow path (53). The cooling side passageway (86) of the first adsorption element (81) is in communication with the third upper-right flow path (51) as well as with the third lower-central flow path (54). In addition, the humidity adjusting side passageway (85) of the second adsorption element (82) is in communication with the third lower-central flow path (54) as well as with the third upper-left flow path (55). The cooling side passageway (86) of the second adsorption element (82) is in communication with the third upper-central flow path (53) as well as with the third lower-left flow path (56).

As also shown in FIG. 4(a), in this state the first air flows into the humidity adjusting side passageway (85) of the first adsorption element (81) from the third lower-right flow path (52). During the flow through the humidity adjusting side passageway (85), water vapor contained in the first air is adsorbed into the adsorbent. The first air humidified by the humidity adjusting side passageway (85) flows into the third upper-central flow path (53).

On the other hand, the second air flows into the cooling side passageway (86) of the first adsorption element (81) from the third upper-right flow path (51). During the flow through the cooling side passageway (86), the second air absorbs heat of adsorption generated when water vapor is adsorbed into the adsorbent in the humidity adjusting side passageway (85). The second air, which has robbed heat of adsorption, flows into the third lower-central flow path (54). During the flow through the third lower-central flow path (54), the second air passes through the regenerative heat exchanger (92). In the regenerative heat exchanger (92) the second air is subjected to heat exchange with refrigerant and absorbs heat of condensation of the refrigerant.

The second air heated in the first adsorption element (81) and the regenerative heat exchanger (92) is introduced into the humidity adjusting side passageway (85) of the second adsorption element (82). In the humidity adjusting side passageway (85), the adsorbent is heated by the second air and, as a result, water vapor is desorbed from the adsorbent. In other words, the adsorbent is regenerated. And, the water vapor desorbed from the adsorbent is given to the second air and the second air is humidified accordingly. The second air humidified in the second adsorption element (82) flows into the third upper-left flow path (55).

The third upper-left opening (38) of the third partition plate (34) is in the communicating state. The notched opening (77) of the fourth rotary damper (74) is oriented such that it is located at the upper-left position and opens to the fourth upper-left flow path (67). A lower half portion of the fourth left side opening (33) is in the open state. In this state, the second air humidified by the second adsorption element (82) passes through the third upper-left flow path (55), the third upper-left opening (38), the fourth upper-left flow path (67), the inside of the fourth rotary damper (74), and the fourth left side opening (33) in that order, and flows into the fifth lower flow path (62).

During the flow through the fifth lower flow path (62), the second air passes through the second cooling heat exchanger (94). At this time, no refrigerant flows in the second cooling heat exchanger (94). Accordingly, the second air just passes through the second cooling heat exchanger (94) and, therefore, neither absorbs nor liberates heat. And, the second air heated and humidified passes through the air supply side outlet (14) and is supplied indoors.

The second central opening (27) of the second partition plate (24) is in the communicating state. The notched opening (77) of the second rotary damper (72) is oriented such that it is located at the upper-right position and opens to the second upper-central flow path (45). A lower half portion of the first left side opening (23) is in the open state. In this state, the first air dehumidified in the first adsorption element (81) passes through the third upper-central flow path (53), the second central opening (27), the second upper-central flow path (45), the inside of the second rotary damper (72), and the first left side opening (23) in that order, and flows into the first lower flow path (42).

During the flow through the first lower flow path (42), the first air passes through the first cooling heat exchanger (93). In the first cooling heat exchanger (93), the first air is subjected to heat exchange with refrigerant, and the refrigerant in the refrigerant circuit absorbs heat from the first air and evaporates. Thereafter, the first air passes through the air discharge side outlet (16) and is discharged outdoors.

Effects of First Embodiment

In the first embodiment, the adsorbents of the first and second adsorption elements (81, 82) are regenerated by making use of the second air heated in the regenerative heat exchanger (92) of the refrigerant circuit. In the refrigeration cycle of the refrigerant circuit, the refrigerant, which has adsorbed heat from the first air either in the first cooling heat exchanger (93) or in the second cooling heat exchanger (94), liberates heat to the second air in the regenerative heat exchanger (92). And, the amount of heat that is given to the second air in the regenerative heat exchanger (92) becomes greater than the electric power required to drive the compressor (91). Accordingly, in accordance with the first embodiment the second air is heated by the refrigeration cycle of the refrigerant circuit, thereby making it possible to provide a dehumidification power in excess of the power consumption of the compressor (91). As a result, the energy efficiency of an air conditioning apparatus which adjusts air humidity is improved and energy costs required for air humidity adjustment operations are cut down.

FIRST MODIFICATION EXAMPLE OF FIRST EMBODIMENT

In the first embodiment both the first and second adsorption elements (81, 82) are disposed in such orientation that each side surface forms an inclined surface that is inclined an angle of 45 degrees; however, the adsorption elements (81, 82) may be disposed using the following alternative arrangement. In other words, it may be arranged such that the first adsorption element (81) and the second adsorption element (82) are disposed such that one side surface of the first adsorption element (81) and one side surface of the second adsorption element (82) face each other and, in addition, the regenerative heat exchanger (92) is interposed therebetween (see FIG. 9).

Figure 9A:
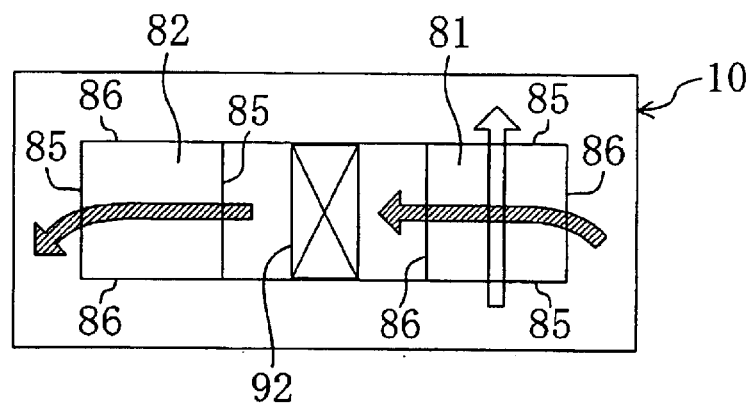
FIG. 9, which is a view similar to FIG. 4, shows an air conditioning apparatus according to a modification example of the first embodiment.
Figure 9B:
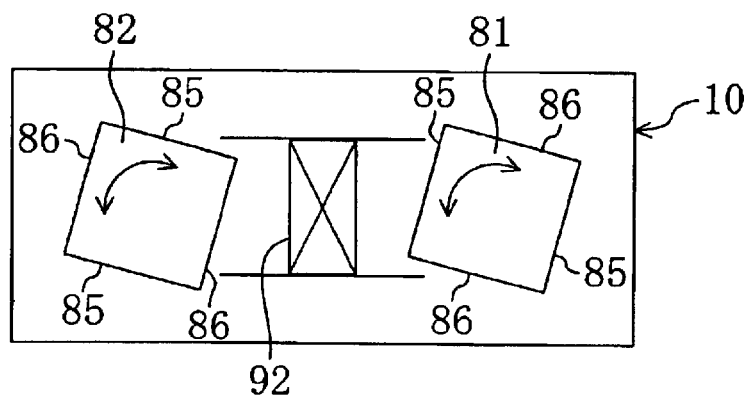
Figure 9C:
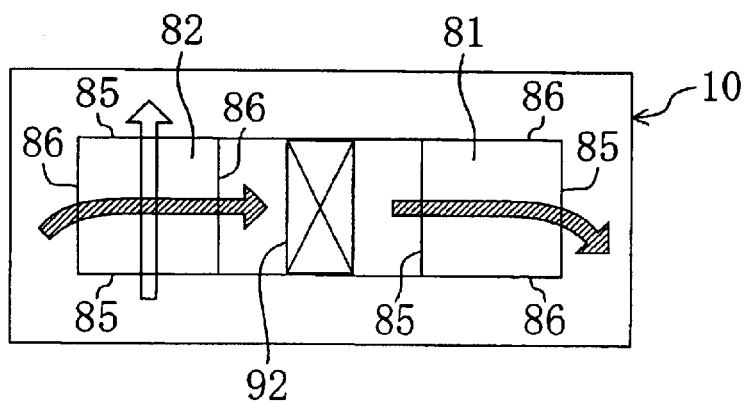

In the air conditioning apparatus of the first modification example, in the first operation of the dehumidification operating mode the first air passes through the first adsorption element (81) from bottom up, as shown in FIG. 9(a). In addition, the second air flows from right to left and passes through the first adsorption element (81), the regenerative heat exchanger (92), and the second adsorption element (82) in that order. Thereafter, the first and second adsorption elements (81, 82) are rotated an angle of 90 degrees (see FIG. 9(b)), and the second operation is carried out. In the second operation of the dehumidification operating mode, the first air passes through the second adsorption element (82) form bottom up, as shown in FIG. 9(c). In addition, the second air flows from left to right and passes through the second adsorption element (82), the regenerative heat exchanger (92), and the first adsorption element (81) in that order.

On the other hand, in the first operation of the humidification operating mode the first air passes through the second adsorption element (82) from bottom up, as shown in FIG. 9(c). In addition, the second air flows from left to right and passes through the second adsorption element (82), the regenerative heat exchanger (92), and the first adsorption element (81) in that order. Thereafter, the first and second adsorption elements (81, 82) are rotated an angle of 90 degrees (see FIG. 9(b)), and the second operation is carried out. In the second operation of the humidification operating mode the first air passes through the first adsorption element (81) from bottom up, as shown in FIG. 9(a). In addition, the second air flows from right to left and passes through the first adsorption element (81), the regenerative heat exchanger (92), and the second adsorption element (82) in that order.

SECOND MODIFICATION EXAMPLE OF FIRST EMBODIMENT

Although in the first embodiment both the air supply fan (95) and the air discharge fan (96) are disposed on the side of the indoor side panel (12) in the casing (10), they may alternatively be arranged as follows. In other words, contrary to the first embodiment, both the air supply fan (95) and the air discharge fan (96) may be disposed on the side of the outdoor side panel (11). In addition, it may be arranged such that either one of the air supply fan (95) and the air discharge fan (96) is disposed on the side of the indoor side panel (12) and the other is disposed on the side of the outdoor side panel (11).

SECOND EMBODIMENT OF INVENTION

An air conditioning apparatus according to a second embodiment of the present invention is so formed as to switchably perform a dehumidification operating mode in which outside air dehumidified and cooled is supplied indoors and a humidification operating mode in which outside air heated and humidified is supplied indoors. In addition, the air conditioning apparatus of the second embodiment comprises two adsorption elements (81, 82) and is so formed as to perform a so-called batch operation. The air conditioning apparatus of the second embodiment differs from the first embodiment in that the adsorption elements (81, 82) is fixed, in other words they do not rotate.

Figure 10:
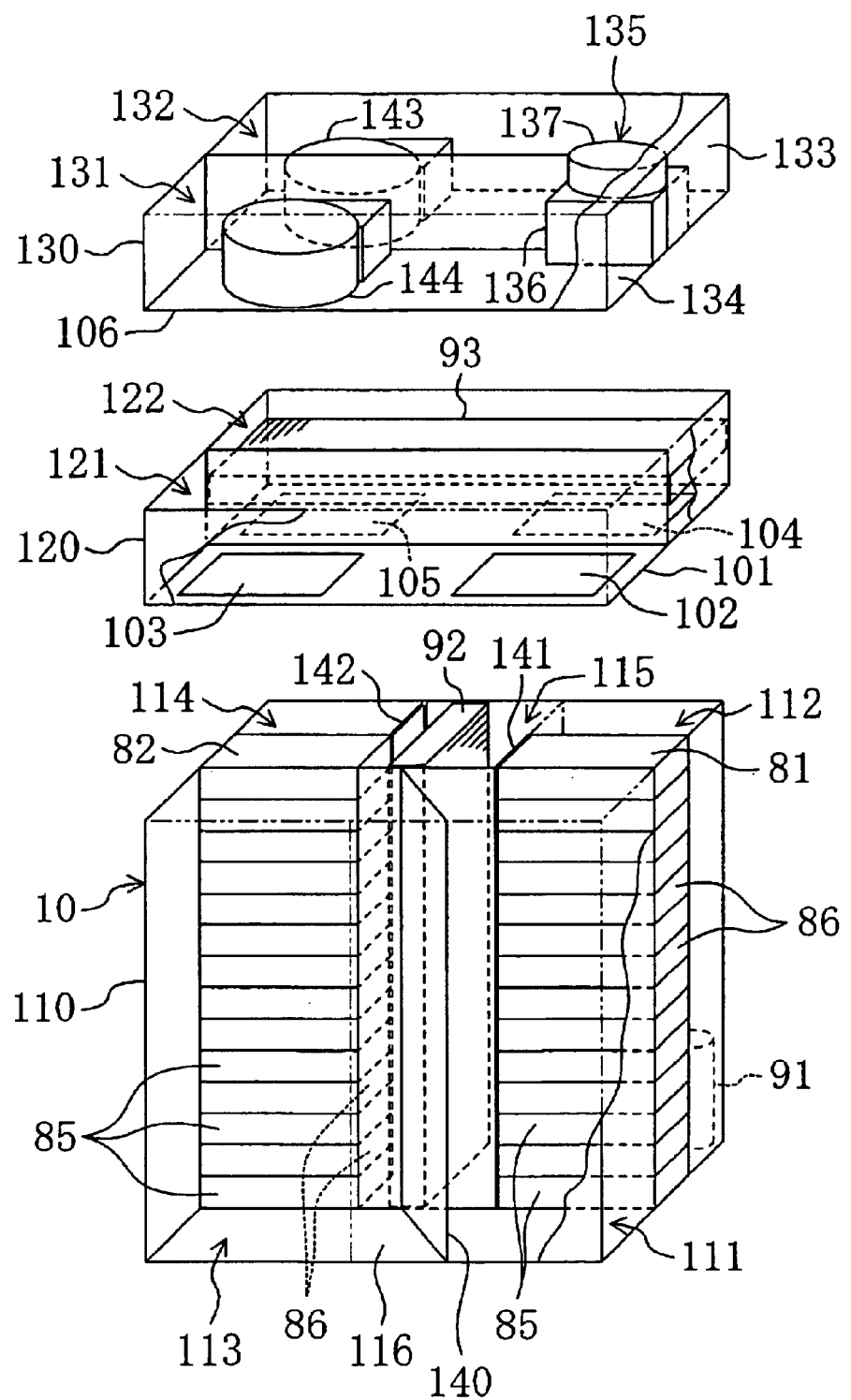
FIG. 10 is an exploded perspective view showing an arrangement of an air conditioning apparatus according to a second embodiment of the present invention.

As shown in FIG. 10, the air conditioning apparatus of the second embodiment comprises a casing (10) shaped like an oblong, rectangular parallelepiped. The casing (10) houses, in addition to the two adsorption elements (81, 82), a refrigerant circuit. The adsorption elements (81, 82) are identical with their counterparts of the first embodiment and, therefore, the description thereof is omitted.

The refrigerant circuit is a closed circuit formed by piping connection of a compressor (91), a regenerative heat exchanger (92) which operates a condenser, an expansion valve which operates as an expansion mechanism, and a cooling heat exchanger (93) which operates as an evaporator. Diagrammatic representation of the entire arrangement of the refrigerant circuit and the expansion valve is omitted. The refrigerant circuit is so constructed as to perform a vapor compression refrigeration cycle by circulating charged refrigerant.

The casing (10) houses a first partition panel (101) and a second partition panel (106). The first partition panel (101) and the second partition panel (106) are disposed vertically in that order, thereby dividing the internal space of the casing (10) into upper and lower spaces. In addition, in the casing (10) a part underlying the first partition panel (101) constitutes a lower section (110), and a part interposing between the first partition panel (101) and the second partition panel (106) constitutes a middle section (120), and a part overlying the second partition panel (106) constitutes an upper section (130).

In the lower section (110) of the casing (10), the two adsorption elements (81, 82) are arranged, in a lateral row, centrally relative to the front-rear direction. Each of the adsorption elements (81, 82) is standingly disposed in such orientation that their longitudinal directions extend vertically. And, the first adsorption element (81) is disposed at the right of the lower section (110), while the second adsorption element (82) is disposed at the left of the lower section (110). In this state, the cooling side passageway (86) of the first adsorption element (81) opens in a right side surface of the casing (10). On the other hand, the cooling side passageway (86) of the second adsorption element (82) opens in a left side surface of the casing (10).

In a right-hand side part of the lower section (110), a lower right-front flow path (111) is divisionally formed in front of the first adsorption element (81), and a lower right-rear flow path (112) is divisionally formed at the rear of the first adsorption element (81). The compressor (91) of the refrigerant circuit is housed in the lower right-rear flow path (112). On the other hand, in a left-hand side part of the lower section (110) a lower left-front flow path (113) is divisionally formed in front of the second adsorption element (82), and a lower left-rear flow path (114) is divisionally formed at the rear of the second adsorption element (82).

Additionally, in the inside of the lower section (110), a lower central flow path (115) is divisionally formed between the first adsorption element (81) and lower right-rear flow path (112), and the second adsorption element (82) and lower left-rear flow path (114). The lower central flow path (115) constitutes an air flow path for regeneration. And, the regenerative heat exchanger (92) is so disposed as to cross the lower central flow path (115).

In a front surface of the lower section (110), an oblong, rectangular suction opening (116) opens centrally relative to the horizontal direction. The lower section (110) is provided, at a position thereof corresponding to the suction opening (116), with a turning damper (140). The turning damper (140) is shaped like an oblong, rectangular plate and rotates on its rear end as an axis. By virtue of the operation of the turning damper (140), switching between a state in which the suction opening (116) communicates only with the lower right-front flow path (111), and a state in which the suction opening (116) communicates only with the lower left-front flow path (113), is made. In other words, the turning damper (140) constitutes a switching mechanism.

Furthermore, the lower section (110) houses two slide dampers (141, 142) each shaped like an oblong, rectangular plate. Each slide damper (141, 142) constitutes a switching mechanism.

The first slide damper (141), disposed between the first adsorption element (81) and lower right-rear flow path (112), and the lower central flow path (115), is formed movably back and forth. By virtue of the operation of the first slide damper (141), switching between a state in which the cooling side passageway (86) of the first adsorption element (81) is disconnected from the lower central flow path (115) while the lower right-rear flow path (112) comes into communication with the lower central flow path (115), and a state in which the cooling side passageway (86) of the first adsorption element (81) comes into communication with the lower central flow path (115) while the lower right-rear flow path (112) is disconnected from the lower central flow path (115), is made.

The second slide damper (142), disposed between the second adsorption element (82) and lower left-rear flow path (114), and the lower central flow path (115), is formed movably back and forth. By virtue of the operation of the second slide damper (142), switching between a state in which the cooling side passageway (86) of the second adsorption element (82) is disconnected from the lower central flow path (115) while the lower left-rear flow path (114) comes into communication with the lower central flow path (115), and a state in which the cooling side passageway (86) of the second adsorption element (82) comes into communication with the lower central flow path (115) while the lower left-rear flow path (114) is disconnected from the lower central flow path (115), is made.

The internal space of the middle section (120) is divided into a front-side portion and a rear-side portion, in other words a middle front-side flow path (121) and a middle rear-side flow path (122) are divisionally formed on the front and rear sides of the middle section (120), respectively.

A right-front opening (102) is formed in a right-front corner of the first partition panel (101). A left-front opening (103) is formed in a left-front corner of the first partition panel (101). The right-front opening (102) is openable and closable and brings the lower right-front flow path (111) and the middle front-side flow path (121) into communication with each other. The left-front opening (103) is openable and closable and brings the lower left-front flow path (113) and the middle front-side flow path (121) into communication with each other.

In addition, a right-rear opening (104) is formed in a right-rear corner of the first partition panel (101). A left-rear opening (105) is formed in a left-rear corner of the first partition panel (101). The right-rear opening (104) is openable and closable and brings the lower right-rear flow path (112) and the middle rear-side flow path (122) into communication with each other. The left-rear opening (105) is openable and closable and brings the lower left-rear flow path (114) and the middle rear-side flow path (122) into communication with each other.

The internal space of the upper section (130) is divided into a front-side portion and a rear-side portion, in other words an upper front-side flow path (131) and an upper rear-side flow path (132) are divisionally formed on the front and rear sides of the upper section (130), respectively. The upper front-side flow path (131) is provided with a second fan (144). The upper front-side flow path (131) is brought into communication with the middle front-side flow path (121) by the second fan (144). The upper rear-side flow path (132) is provided with a first fan (143). The upper rear-side flow path (132) is brought into communication with the middle rear-side flow path (122) by the first fan (143).

A first air discharge opening (133) and a second air discharge opening (134) are opened in a right end surface of the upper section (130). The first air discharge opening (133) brings the upper rear-side flow path (132) into communication with the casing (10). The second air discharge opening (134) brings the upper front-side flow path (131) into communication with the casing (10). In addition, the first air discharge opening (133) and the second air discharge opening (134) are formed such that, when one of them is placed in the open state, the other is placed in the closed state.

An air supply opening (135) is disposed to the right end of the upper section (130). The air supply opening (135) comprises a box-shaped member (136) and a cylinder-shaped member (137) placed on the box-shaped member (136). The box-shaped member (136) of the air supply opening (135) is formed such that its front and rear surfaces are openable and closable. When the front surface of the box-shaped member (136) is placed in the open state, the upper front-side flow path (131) comes into communication with the inside of the box-shaped member (136). When the rear surface of the box-shaped member (136) is placed in the open state, the upper rear-side flow path (132) comes into communication with the inside of the box-shaped member (136).

Running Operation

Figure 11:
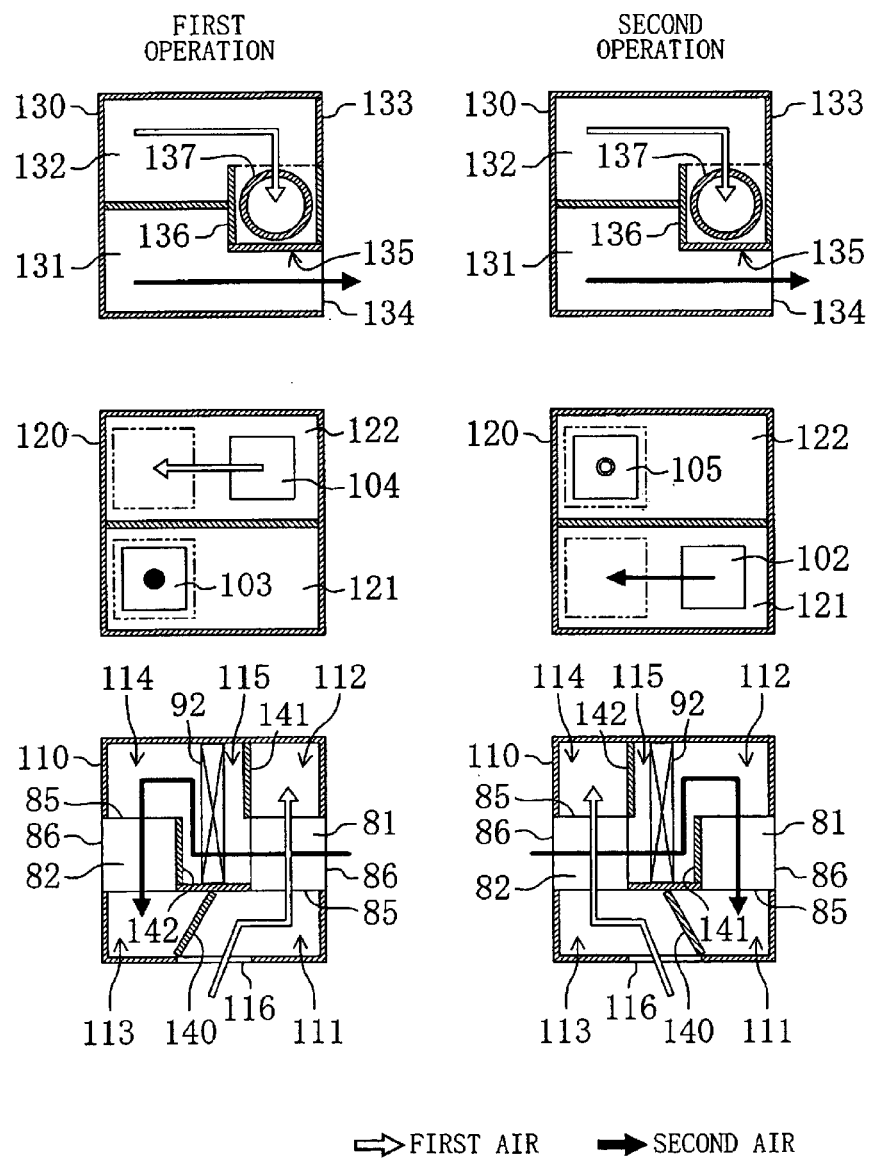
FIG. 11 is a diagram typically showing a dehumidification operating mode of the air conditioning apparatus according to the second embodiment.
Figure 12:
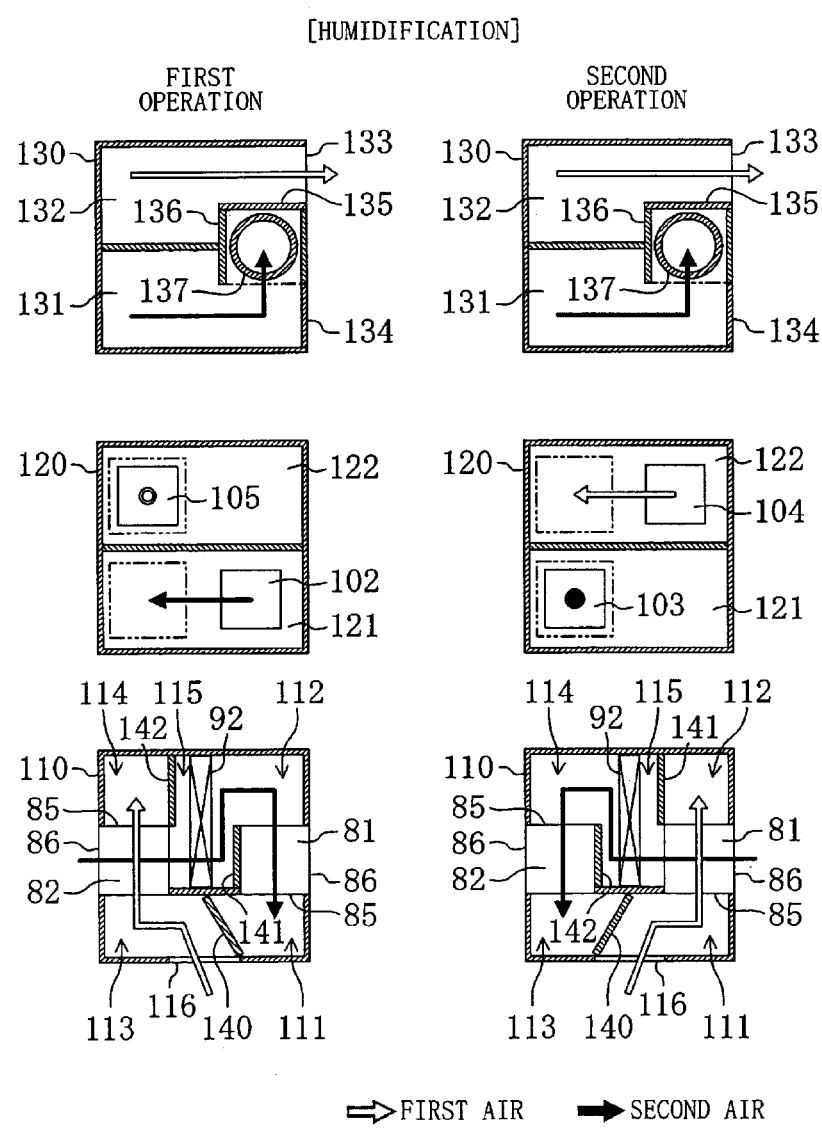
FIG. 12 is a diagram typically showing a humidification operating mode of the air conditioning apparatus according to the second embodiment.

The running operation of the air conditioning apparatus will be described with reference to FIGS. 10–12. Note that FIGS. 11 and 12 each provide typical diagrammatic representation of each of the upper section (130), the middle section (120), and the lower section (110) when viewed from above.

Dehumidification Operating Mode

The air conditioning apparatus performs a dehumidification operating mode by repeating in alternation a first operation and a second operation. During that time, the first fan (143) and the second fan (144) are activated and a refrigeration cycle is carried out by causing refrigerant to circulate in the refrigerant circuit. Here, the first and second operations in the dehumidification operating mode will be described with reference to FIG. 11.

In the first operation of the dehumidification operating mode, a dehumidifying operation and a regenerating operation are carried out. And, during the first operation air is dehumidified in the first adsorption element (81) and, at the same time, the adsorbent of the second adsorption element (82) is regenerated.

In the lower section (110), the turning damper (140) is turned to the left, and the suction opening (116) comes into communication with the lower right-front flow path (111). In addition, the first slide damper (141) moves and, as a result, the cooling side passageway (86) of the first adsorption element (81) comes into communication with the lower central flow path (115), and the second slide damper (142) moves and, as a result, the lower left-rear flow path (114) comes into communication with the lower central flow path (115).

In this state, outdoor air flows, as first air, into the lower right-front flow path (111) from the suction opening (116). The first air flows into the humidity adjusting side passageway (85) of the first adsorption element (81) from the lower right-front flow path (111). During the flow through the humidity adjusting side passageway (85), water vapor contained in the first air is adsorbed into the adsorbent. The first air dehumidified in the humidity adjusting side passageway (85) flows into the lower right-rear flow path (112).

On the other hand, outdoor air flows, as second air, into the cooling side passageway (86) of the first adsorption element (81) which opens in the right side surface of the lower section (110). During the flow through the cooling side passageway (86), the second air absorbs heat of adsorption generated when water vapor is adsorbed into the adsorbent in the humidity adjusting side passageway (85). The second air, which has robbed heat of adsorption, flows into the lower central flow path (115). During the flow through the lower central flow path (115), the second air passes through the regenerative heat exchanger (92). In the regenerative heat exchanger (92), the second air is subjected to heat exchange with refrigerant and absorbs heat of condensation of the refrigerant.

The second air heated by the first adsorption element (81) and the regenerative heat exchanger (92) flows through the lower left-rear flow path (114) and is introduced into the humidity adjusting side passageway (85) of the second adsorption element (82). In the humidity adjusting side passageway (85), the adsorbent is heated by the second air and, as a result, water vapor is desorbed from the adsorbent. In other words, the adsorbent is regenerated. The water vapor desorbed from the adsorbent flows, together with the second air, into the lower left-front flow path (113).

In the first partition panel (101), the right-rear opening (104) and the left-front opening (103) are placed in the open state, while the right-front opening (102) and the left-rear opening (105) are placed in the closed state. In the upper section (130), the second air discharge opening (134) is placed in the open state, while the first air discharge opening (133) is placed in the closed state. In the air supply opening (135), the front surface of the box-shaped member (136) is placed in the closed state, while the rear surface thereof is placed in the open state.

In this state, the first air dehumidified in the first adsorption element (81) passes through the right-rear opening (104) from the lower right-rear flow path (112) and flows into the middle rear-side flow path (122). During the flow through the middle rear-side flow path (122), the first air passes through the cooling heat exchanger (93). In the cooling heat exchanger (93), the first air is subjected to heat exchange with refrigerant and liberates heat to the refrigerant. Thereafter, the first air is drawn in to the first fan (143) and flows into the upper rear-side flow path (132). And, the first air dehumidified and cooled flows into the box-shaped member (136) of the air supply opening (135) and is supplied indoors.

On the other hand, the second air, which has flowed out of the second adsorption element (82), passes through the left-front opening (103) from the lower left-front flow path (113) and flows into the middle front-side flow path (121). The second air of the middle front-side flow path (121) is drawn in to the second fan (144) and flows into the upper front-side flow path (131). Thereafter, the second air passes through the second air discharge opening (134) and is discharged outdoors.

In the second operation of the dehumidification operating mode, a dehumidifying operation and a regenerating operation are carried out. And, during the second operation, contrary to the first operation, air is dehumidified in the second adsorption element (82) and, at the same time, the adsorbent of the first adsorption element (81) is regenerated.

In the lower section (110), the turning damper (140) is turned to the right, and the suction opening (116) comes into communication with the lower left-front flow path (113). In addition, the first slide damper (141) moves and, as a result, the lower right-rear flow path (112) comes into communication with the lower central flow path (115), and the second slide damper (142) moves and, as a result, the cooling side passageway (86) of the second adsorption element (82) comes into communication with the lower central flow path (115).

In this state, outdoor air flows, as first air, into the lower left-front flow path (113) from the suction opening (116). Then, the first air flows into the humidity adjusting side passageway (85) of the second adsorption element (82) from the lower left-front flow path (113). During the flow through the humidity adjusting side passageway (85), water vapor contained in the first air is adsorbed into the adsorbent. The first air dehumidified in the humidity adjusting side passageway (85) flows into the lower left-rear flow path (114).

On the other hand, outdoor air flows, as second air, into the cooling side passageway (86) of the second adsorption element (82) which opens in the left side surface of the lower section (110). During the flow through the cooling side passageway (86), the second air absorbs heat of adsorption generated when water vapor is adsorbed into the adsorbent in the humidity adjusting side passageway (85). The second air, which has robbed heat of adsorption, flows into the lower central flow path (115). During the flow through the lower central flow path (115), the second air passes through the regenerative heat exchanger (92). In the regenerative heat exchanger (92), the second air is subjected to heat exchange with refrigerant and absorbs heat of condensation of the refrigerant.

The second air heated by the second adsorption element (82) and the regenerative heat exchanger (92) flows through the lower right-rear flow path (112) and is introduced into the humidity adjusting side passageway (85) of the first adsorption element (81). In the humidity adjusting side passageway (85), the adsorbent is heated by the second air and, as a result, water vapor is desorbed from the adsorbent. In other words, the adsorbent is regenerated. The water vapor desorbed from the adsorbent flows, together with the second air, into the lower right-front flow path (111).

In the first partition panel (101), the right-front opening (102) and the left-rear opening (105) are placed in the open state, while the right-rear opening (104) and the left-front opening (103) are placed in the closed state. In the upper section (130), the second air discharge opening (134) is placed in the open state, while the first air discharge opening (133) is placed in the closed state. In the air supply opening (135), the front surface of the box-shaped member (136) is placed in the closed state, while the rear surface thereof is placed in the open state.

In this state, the first air dehumidified in the second adsorption element (82) passes through the left-rear opening (105) from the lower left-rear flow path (114) and flows into the middle rear-side flow path (122). During the flow the middle rear-side flow path (122), the first air passes through the cooling heat exchanger (93). In the cooling heat exchanger (93), the first air is subjected to heat exchange with refrigerant and liberates heat to the refrigerant. Thereafter, the first air is drawn in to the first fan (143) and flows into the upper rear-side flow path (132). And, the first air dehumidified and cooled flows into the box-shaped member (136) of the air supply opening (135) and is supplied indoors.

On the other hand, the second air, which has flowed out of the first adsorption element (81), passes through the right-front opening (102) from the lower right-front flow path (111) and flows into the middle front-side flow path (121). The second air of the middle front-side flow path (121) is drawn in to the second fan (144) and flows into the upper front-side flow path (131). Thereafter, the second air passes through the second air discharge opening (134) and is discharged outdoors.

Humidification Operating Mode

The air conditioning apparatus performs a humidification operating mode by repeating in alternation a first operation and a second operation. During that time, the first fan (143) and the second fan (144) are activated and a refrigeration cycle is carried out by causing refrigerant to circulate in the refrigerant circuit. Here, the first and second operations in the humidification operating mode will be described with reference to FIG. 12.

In the first operation of the humidification operating mode, a dehumidifying operation and a regenerating operation are carried out. And, during the first operation air is humidified in the first adsorption element (81) and, at the same time, water vapor is adsorbed into the adsorbent of the second adsorption element (82).

In the lower section (110), the turning damper (140) is turned to the right, and the suction opening (116) comes into communication with the lower left-front flow path (113). Additionally, the first slide damper (141) moves and, as a result, the lower right-rear flow path (112) comes into communication with the lower central flow path (115), and the second slide damper (142) moves and, as a result, the cooling side passageway (86) of the second adsorption element (82) comes into communication with the lower central flow path (115).

In this state, outdoor air flows, as first air, into the lower left-front flow path (113) from the suction opening (116). Then, the first air flows into the humidity adjusting side passageway (85) of the second adsorption element (82) from the lower left-front flow path (113). During the flow through the humidity adjusting side passageway (85), water vapor contained in the first air is adsorbed into the adsorbent. The first air dehumidified in the humidity adjusting side passageway (85) flows into the lower left-rear flow path (114).

On the other hand, outdoor air flows, as second air, into the cooling side passageway (86) of the second adsorption element (82) which opens in the left side surface of the lower section (110). During the flow through the cooling side passageway (86), the second air absorbs heat of adsorption generated when water vapor is adsorbed into the adsorbent in the humidity adjusting side passageway (85). The second air, which has robbed heat of adsorption, flows into the lower central flow path (115). During the flow through the lower central flow path (115), the second air passes through the regenerative heat exchanger (92). In the regenerative heat exchanger (92), the second air is subjected to heat exchange with refrigerant and absorbs heat of condensation of the refrigerant.

The second air heated by the second adsorption element (82) and the regenerative heat exchanger (92) flows through the lower right-rear flow path (112) and is introduced into the humidity adjusting side passageway (85) of the first adsorption element (81). In the humidity adjusting side passageway (85), the adsorbent is heated by the second air and, as a result, water vapor is desorbed from the adsorbent. In other words, the adsorbent is regenerated. The water vapor desorbed from the adsorbent is given to the second air, so that the second air is humidified. The second air humidified in the first adsorption element (81) flows into the lower right-front flow path (111).

In the first partition panel (101), the right-front opening (102) and the left-rear opening (105) are placed in the open state, while the right-rear opening (104) and the left-front opening (103) are placed in the closed state. In the upper section (130), the first air discharge opening (133) is placed in the open state, while the second air discharge opening (134) is placed in the closed state. In the air supply opening (135), the front surface of the box-shaped member (136) is placed in the open state, while the rear surface thereof is placed in the closed state.

In this state, the second air humidified in the first adsorption element (81) passes through the right-front opening (102) from the lower right-front flow path (111) and flows into the middle front-side flow path (121). The second air of the middle front-side flow path (121) is drawn in to the second fan (144) and flows into the upper front-side flow path (131). And, the second air heated and dehumidified flows into the box-shaped member (136) of the air supply opening (135) and is supplied indoors.

On the other hand, the first air dehumidified in the second adsorption element (82) passes through the left-rear opening (105) from the lower left-rear flow path (114) and flows into the middle rear-side flow path (122). During the flow the middle rear-side flow path (122), the first air passes through the cooling heat exchanger (93). In the cooling heat exchanger (93), the first air is subjected to heat exchange with refrigerant and the refrigerant in the refrigerant circuit absorbs heat from the first air. Thereafter, the first air is drawn in to the first fan (143) and flows into the upper rear-side flow path (132). Then, the first air passes through the first air discharge opening (133) and is discharged outdoors.

In the second operation of the humidification operating mode, a dehumidifying operation and a regenerating operation are carried out. And, during the second operation, contrary to the first operation, air is humidified in the second adsorption element (82) and, at the same time, water vapor is adsorbed into the adsorbent of the first adsorption element (81).

In the lower section (110), the turning damper (140) is turned to the left and, as a result, the suction opening (116) comes into communication with the lower right-front flow path (111). Additionally, the first slide damper (141) moves and, as a result, the cooling side passageway (86) of the first adsorption element (81) comes into communication with the lower central flow path (115), and the second slide damper (142) moves and, as a result, the lower left-rear flow path (114) comes into communication with the lower central flow path (115).

In this state, outdoor air flows, as first air, into the lower right-front flow path (111) from the suction opening (116). The first air flows into the humidity adjusting side passageway (85) of the first adsorption element (81) from the lower right-front flow path (111). During the flow through the humidity adjusting side passageway (85), water vapor contained in the first air is adsorbed into the adsorbent. The first air dehumidified in the humidity adjusting side passageway (85) flows into the lower right-rear flow path (112).

On the other hand, outdoor air flows, as second air, into the cooling side passageway (86) of the first adsorption element (81) which opens in the right side surface of the lower section (110). During the flow through the cooling side passageway (86), the second air absorbs heat of adsorption generated when water vapor is adsorbed into the adsorbent in the humidity adjusting side passageway (85). The second air, which has robbed heat of adsorption, flows into the lower central flow path (115). During the flow through the lower central flow path (115), the second air passes through the regenerative heat exchanger (92). In the regenerative heat exchanger (92), the second air is subjected to heat exchange with refrigerant and absorbs heat of condensation of the refrigerant.

The second air heated by the first adsorption element (81) and the regenerative heat exchanger (92) flows through the lower left-rear flow path (114) and is introduced into the humidity adjusting side passageway (85) of the second adsorption element (82). In the humidity adjusting side passageway (85), the adsorbent is heated by the second air and, as a result, water vapor is desorbed from the adsorbent. In other words, the adsorbent is regenerated. The water vapor desorbed from the adsorbent is given to the second air, so that the second air is humidified. The second air humidified in the second adsorption element (82) flows into the lower left-front flow path (113).

In the first partition panel (101), the right-rear opening (104) and the left-front opening (103) are placed in the open state, while the right-front opening (102) and the left-rear opening (105) are placed in the closed state. In the upper section (130), the first air discharge opening (133) is placed in the open state, while the second air discharge opening (134) is placed in the closed state. In the air supply opening (135), the front surface of the box-shaped member (136) is placed in the open state, while the rear surface thereof is placed in the closed state.

In this state, the second air humidified in the second adsorption element (82) passes through the left-front opening (103) from the lower left-front flow path (113) and flows into the middle front-side flow path (121). The second air in the middle front-side flow path (121) is drawn in to the second fan (144) and flows into the upper front-side flow path (131). And, the second air heated and humidified flows into the box-shaped member (136) of the air supply opening (135) and is supplied indoors.

On the other hand, the first air dehumidified in the first adsorption element (81) passes through the right-rear opening (104) from the lower right-rear flow path (112) and flows into the middle rear-side flow path (122). During the flow through the middle rear-side flow path (122), the first air passes through the cooling heat exchanger (93). In the cooling heat exchanger (93), the first air is subjected to heat exchange with refrigerant and the refrigerant in the refrigerant circuit absorbs heat from the first air. Thereafter, the first air is drawn in to the first fan (143) and flows into the upper rear-side flow path (132). Then, the first air passes through the first air discharge opening (133) and is discharged outdoors.

THIRD EMBODIMENT OF INVENTION

An air conditioning apparatus according to a third embodiment of the present invention has only one adsorption element, i.e., an adsorption element (150) of the so-called rotor type. The air conditioning apparatus of the third embodiment performs a dehumidifying operation and a regenerating operation and is so formed as to perform air dehumidification by the adsorption element (150) concurrently with adsorbent regeneration of the adsorption element (150).

Figure 13:
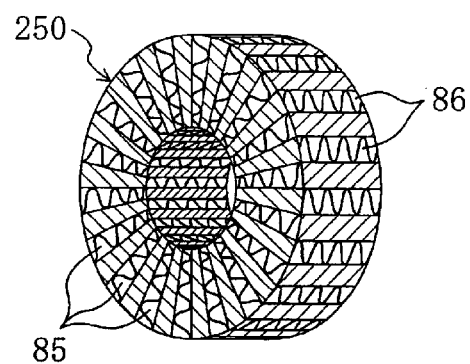
FIG. 13 is a schematic perspective view showing an adsorption element of an air conditioning apparatus according to a third embodiment of the present invention.

As shown in FIG. 13, the adsorption element (150) of the third embodiment is shaped like a doughnut or like a thick cylinder. The adsorption element (150) comprises an alternating arrangement of humidity adjusting side and cooling side passageways (85, 86) divisionally formed in the circumferential direction of the adsorption element (150).

Each humidity adjusting side passageway (85) penetrates the adsorption element (150) in the axial direction thereof. In other words, the humidity adjusting side passageway (85) opens in front and rear surfaces of the adsorption element (150) in FIG. 13. Additionally, an internal wall of the humidity adjusting side passageway (85) is coated with an adsorbent. On the other hand, each cooling side passageway (86) penetrates the adsorption element (150) in the radial direction thereof. In other words, the cooling side passageway (86) opens in outer and inner peripheral surfaces of the adsorption element (150).

Figure 14:
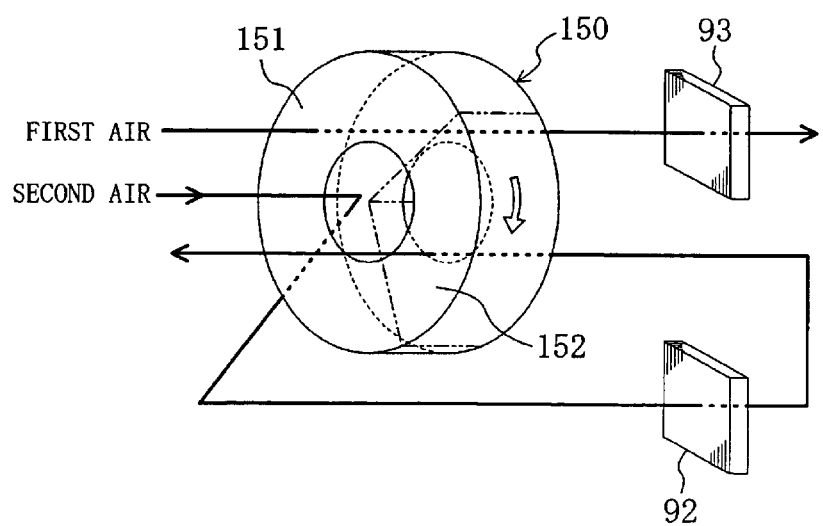
FIG. 14 is a schematic construction diagram of the air conditioning apparatus according to the third embodiment.

As shown in FIG. 14, in the air conditioning apparatus the adsorption element (150) is so disposed as to extend over an adsorption zone (151) and a regeneration zone (152). The adsorption element (150) is driven continuously rotationally on an axis passing through the center thereof.

The air conditioning apparatus is provided with a refrigerant circuit. The refrigerant circuit is a closed circuit formed by piping connection of a compressor, a regenerative heat exchanger (92) which operates as a condenser, an expansion valve which operates as an expansion mechanism, and a cooling heat exchanger (93) which operates as an evaporator. The refrigerant circuit is so formed as to perform a vapor compression refrigeration cycle by circulation of a refrigerant charged. Only the regenerative heat exchanger (92) and the cooling heat exchanger (93) are represented diagrammatically in FIG. 14.

In the air conditioning apparatus, in a section of the adsorption element (150) that is being located in the adsorption zone (151) the first air is introduced to a humidity adjusting side passageway (85) corresponding to the section, while the second air is introduced into a cooling side passageway (86) corresponding to the section. During that time, the first air is fed to the humidity adjusting side passageway (85) from the side of the front surface of the adsorption element (150) in FIG. 14. On the other hand, the second air is fed to the cooling side passageway (86) from the side of the inner peripheral surface of the adsorption element (150).

In the adsorption zone (151), water vapor contained in the first air is adsorbed into the adsorbent in the humidity adjusting side passageway (85) of the adsorption element (150). Heat of adsorption is generated when water vapor is adsorbed into the adsorbent in the humidity adjusting side passageway (85). The heat of adsorption is given into the second air flowing through the cooling side passageway (86) of the adsorption element (150).

The first air dehumidified in the adsorption zone (151) passes through the cooling heat exchanger (93). In the cooling heat exchanger (93), the first air is subjected to heat exchange with refrigerant and liberates heat to the refrigerant. Thereafter, the first air is supplied indoors if the dehumidification operating mode is selected or outdoors if the humidification operating mode is selected.

On the other hand, the second air, which has robbed heat of adsorption in the adsorption zone (151), passes through the regenerative heat exchanger (92). In the regenerative heat exchanger (92), the second air is subjected to heat exchange with refrigerant and absorbs heat of condensation of the refrigerant. The second air heated in the adsorption zone (151) and the regenerative heat exchanger (92) is introduced to a humidity adjusting side passageway (85) of the adsorption element (150) that is being located in the adsorption zone (151). During that time, the second air is fed to the humidity adjusting side passageway (85) from the side of the rear surface of the adsorption element (150) in FIG. 14.

The section of the adsorption element (150) located in the adsorption zone (151) moves to the regeneration zone (152) with the rotation of the adsorption element (150). In a section of the adsorption element (150) that is being located in the regeneration zone (152), the adsorbent is heated by the second air in a humidity adjusting side passageway (85) corresponding to the section and, as a result, water vapor is desorbed from the adsorbent. In other words, the adsorbent is regenerated. The water vapor desorbed from the adsorbent is given to the second air. Thereafter, the second air is discharged outdoors if the dehumidification operating mode is selected or supplied indoors if the humidification operating mode is selected.

Like each of the foregoing embodiments, the air conditioning apparatus of the present embodiment is also able to perform dehumidification and humidification operating modes.

More specifically, in the dehumidification operating mode the air conditioning apparatus draws in outdoor air as first air and draws in indoor air as second air. And, the first air taken in is dehumidified when passing through the humidity adjusting side passageway (85) of the adsorption element (150). Further, the first air is cooled when passing through the cooling heat exchanger (93) and then supplied indoors. Additionally, the second air taken in is heated when passing through the cooling side passageway (86) of the adsorption element (150) and the regenerative heat exchanger (92). And, the second air is used for regeneration of the adsorbent when passing through the humidity adjusting side passageway (85) of the adsorption element (150). Thereafter, the second air is discharged outdoors.

On the other hand, in the humidification operating mode the air conditioning apparatus draws in indoor air as first air and draws in outdoor air as second air. And, the first air taken in is dehumidified when passing through the humidity adjusting side passageway (85) of the adsorption element (150). Further, the first air is divested of heat when passing through the cooling heat exchanger (93). Then, the first air is discharged outdoors. Additionally, the second air taken in is heated when passing through the cooling side passageway (86) of the adsorption element (150) and through the regenerative heat exchanger (92). Then, the second air is humidified when passing through the humidity adjusting side passageway (85) of the adsorption element (150). Thereafter, the second air is supplied indoors.

MODIFICATION EXAMPLE OF THIRD EMBODIMENT

In the air conditioning apparatus of the present embodiment, the structure of the adsorption element (150) may be modified as follows and, in conformity to such modification, the route of flows of the first air and the second air may be modified as follows.

Figure 15:
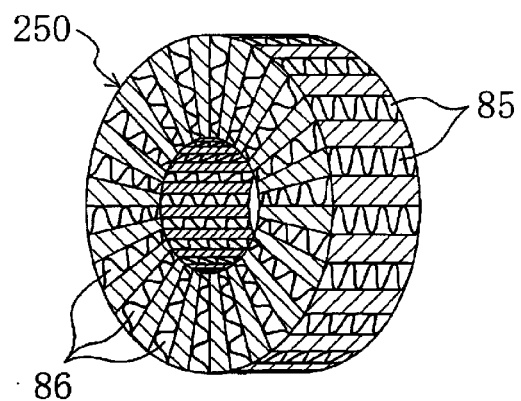
FIG. 15 is a schematic perspective view showing an adsorption element of an air conditioning apparatus according to a modification example of the third embodiment.

As shown in FIG. 15, the adsorption element (150) of the present modification example differs from the adsorption element (150) of FIG. 13 in that the arrangement of the humidity adjusting side passageways (85) and the cooling side passageways (86) is reversed. More specifically, in the adsorption element (150) of the present modification example each humidity adjusting side passageway (85) penetrates the adsorption element (150) in the radial direction thereof. Stated another way, the humidity adjusting side passageway (85) opens in outer and inner peripheral surfaces of the adsorption element (150). On the other hand, each cooling side passageway (86) penetrates the adsorption element (150) in the axial direction thereof. Stated another way, the cooling side passageway (86) opens in front and rear surfaces of the adsorption element (150) of FIG. 15.

Figure 16:
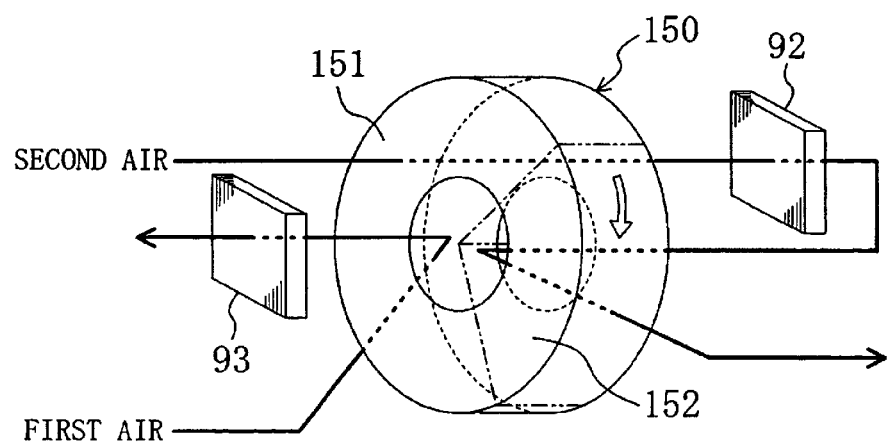
FIG. 16 is a schematic construction diagram of the air conditioning apparatus according to the modification example of the third embodiment.

Also in the air conditioning apparatus of the present modification example, in a section of the adsorption element (150) that is being located in the adsorption zone (151) the first air is introduced to a humidity adjusting side passageway (85) corresponding to the section, while the second air is introduced into a cooling side passageway (86) corresponding to the section. During that time, the first air is fed to the humidity adjusting side passageway (85) from the side of the outer peripheral surface of the adsorption element (150). On the other hand, the second air is fed to the cooling side passageway (86) from the side of the front surface of the adsorption element (150) in FIG. 16.

Additionally, also in the air conditioning apparatus of the present modification example the second air flowing out of the cooling side passageway (86) of the adsorption element (150) is heated in the regenerative heat exchanger (92). Thereafter, the second air is introduced into the humidity adjusting side passageway (85) of the adsorption element (150) located in the regeneration zone (152). During that time, the second air is fed into the humidity adjusting side passageway (85) from the side of the inner periphery of the adsorption element (150).

INDUSTRIAL APPLICABILITY

As has been described above, the present invention is useful for air conditioning apparatus which perform air humidity adjustment.

What is claimed is:

1. An air conditioning apparatus which performs either an operating mode in which air taken in is cooled and dehumidified and then supplied indoors or an operating mode in which air taken in is heated and humidified and then supplied indoors, said air conditioning apparatus comprising:
    a refrigerant circuit, including a compressor, a condenser, an expansion mechanism, and an evaporator, for performing a refrigeration cycle,
    divisionally formed passageways including one or more humidity adjusting side passageways where flowing air comes into contact with an adsorbent, and one or more cooling side passageways through which air flows for taking heat of adsorption from said one or more humidity adjusting side passageways, and
    first and second adsorption elements, collectively in which said one or more humidity adjusting passageways and said one or more cooling side passageways are formed,
    wherein said air conditioning apparatus performs:
        a dehumidifying operation in which first air is dehumidified by a humidity adjusting side passageway and thereafter is subjected to heat exchange with refrigerant in said evaporator; and
        an adsorbent regenerating operation in which said second air, after passing through a cooling side passageway, is subjected to heat exchange with refrigerant in said condenser and thereafter is introduced into a humidity adjusting side passageway, and
    wherein said air conditioning apparatus performs in alternation:
        a first operation in which a dehumidifying operation is carried out by causing first air to flow through a humidity adjusting side passageway of said first adsorption element and, concurrently with said dehumidifying operation, a regenerating operation is carried out by causing second air to flow through a humidity adjusting side passageway of said second adsorption element, and
        a second operation in which a dehumidifying operation is carried out by causing first air to flow through said humidity adjusting side passageway of said second adsorption element and, concurrently with said dehumidifying operation, a regenerating operation is carried out by causing second air to flow through said humidity adjusting side passageway of said first adsorption element.

2. The air conditioning apparatus of claim 1 further comprising:
    an air flow path for regeneration by which an outlet side of a cooling side passageway of any one of said first and second adsorption elements is brought into communication with an inlet side of a humidity adjusting side passageway of the other of said first and second adsorption elements,
    wherein said condenser is so disposed as to cross said regeneration air flow path.

3. The air conditioning apparatus of claim 1, wherein:
    said first and second adsorption elements are each shaped like a square column with four side surfaces,
    in each of said first and second adsorption elements said humidity adjusting side passageway has openings in a pair of opposite side surfaces of said four side surfaces and said cooling side passageway has openings in another pair of opposite side surfaces of said four side surfaces, and
    said first and second adsorption elements are disposed such that the longitudinal direction of said first adsorption element corresponds to the longitudinal direction of said second adsorption element and, in addition, a diagonal line of an end surface of said first adsorption element and a diagonal line of an end surface of the second adsorption element lie in a straight line.

4. The air conditioning apparatus of claim 1, wherein:
    said air conditioning apparatus is constructed so that the route of flows of said first air and said second air is changed for switching between said first operation and said second operation.

5. The air conditioning apparatus of claim 4, wherein:
    the route of flows of said first air and said second air is changed by activating an opening/closing mechanism for opening and closing an air flow path with said adsorption elements fixed in place.

6. The air conditioning apparatus of claim 4, wherein:
    the route of flows of said first air and said second air is changed by activating an opening/closing mechanism for opening and closing an air flow path, and by rotating said adsorption elements.

7. An air conditioning apparatus comprising:
    first and second adsorption elements, each including:
        a humidity adjusting side passageway in which a first air flow comes into contact with an adsorbent, and
        a cooling side passageway in which a second air flow absorbs heat of adsorption from the humidity adjusting side passageway,
    wherein the first and second adsorption elements are configured to collectively perform the following in alternation:
        a first operation in which dehumidification is carried out in the humidity adjusting side passageway of the first adsorption element while adsorbent is concurrently regenerated in the humidity adjusting side passageway of the second adsorption element, and
        a second operation in which dehumidification is carried out in the humidity adjusting side passageway of the second adsorption element while adsorbent is concurrently regenerated in the humidity adjusting side passageway of the first adsorption element,
    wherein:
        during the first operation, the first air flow is directed through the humidity adjusting side passageway of the first adsorption element and, concurrently, the second air flow is directed through the humidity adjusting side passageway of the second adsorption element, and during the second operation, the first air flow is directed through the humidity adjusting side passageway of the second adsorption element and, concurrently, the second air flow is directed through the humidity adjusting side passageway of the first adsorption element, wherein:

during the first operation, the second air flow is directed through the cooling side passageway of the first adsorption element and subjected to heating by the heating element before being directed through the humidity adjusting side passageway of the second adsorption element, and during the second operation, the second air flow is directed through the cooling side passageway of the second adsorption element and subjected to heating by the heating element before being directed through the humidity adjusting side passageway of the first adsorption element, wherein the heating element is a condenser, which is part of a refrigerant circuit for performing a refrigerant cycle.

8. The air conditioning apparatus of claim 7, further comprising:

an air flow path by which an outlet side of a cooling side passageway of any one of said first and second adsorption elements is brought into communication with an inlet side of a humidity adjusting side passageway of the other of the first and second adsorption elements, wherein the heating element is disposed, such that the air flow path is directed through the heating element.

9. The air conditioning apparatus of claim 7, wherein:

the first and second adsorption elements are each shaped like a rectangular column with four side surfaces, in each of the first and second adsorption elements, the humidity adjusting side passageway has openings in a pair of opposite side surfaces of the four side surfaces, and the cooling side passageway has openings in the other pair of opposite side surfaces of the four side surfaces, and the first and second adsorption elements are disposed such that the longitudinal direction of the first adsorption element corresponds to the longitudinal direction of the second adsorption element, and two corners of a cross-section of the first adsorption element is collinear with two corners of a cross-section of the second adsorption element.

10. The air conditioning apparatus of claim 7, wherein the air conditioning apparatus is configured so that the routes of the first and second air flows are changed as the first and second adsorption elements alternate between the first and second operations.

11. The air conditioning apparatus of claim 10, wherein the routes of the first and second air flows are changed by activating an opening/closing mechanism for opening and closing an air flow path while the first and second adsorption elements remain in a fixed position.

12. The air conditioning apparatus of claim 10, wherein the routes of the first and second air flows are changed by activating an opening/closing mechanism for opening and closing an air flow path, and by rotating the first and second adsorption elements.

13. An air conditioning apparatus comprising:

humidity adjusting side passageways in which flowing air comes into contact with an adsorbent;

cooling side passageways through which flowing air absorbs heat of adsorption from humidity adjusting side passageways;

a first adsorption element, which includes the first subset of humidity adjusting side passageways and the cooling side passageways; and a second adsorption element, which includes the second subset of humidity adjusting side passageways, wherein said air conditioning apparatus is configured, without rotating the adsorbent, to concurrently perform the following:

dehumidify air in a first subset of humidity adjusting side passageways by passing a first air flow through the first subset of humidity adjusting side passageways, and regenerate adsorbent in a second subset of humidity adjusting side passageways by passing a second air flow through the second subset of humidity adjusting side passageways, wherein the second air flow is passed through the cooling side passageways and subjected to heat exchange by a condenser before passing through the second subset of humidity adjusting side passageways.

14. The air conditioning apparatus of claim 13, wherein:

the second adsorption element includes cooling side passageways, and the air conditioning apparatus is operable to switch to a state to concurrently perform the following:

dehumidify air in the second subset of humidity adjusting side passageways by passing the first air flow through the second subset of humidity adjusting side passageways, and regenerate adsorbent in the first subset of humidity adjusting side passageways by passing the second air flow through the first subset of humidity adjusting side passageways, wherein the second air flow is passed through the cooling side passageways of the second adsorption element and subjected to heat exchange by the condenser before passing through the first subset of humidity adjusting side passageways.

* * * * *

UNITED STATES PATENT AND TRADEMARK OFFICE
CERTIFICATE OF CORRECTION

PATENT NO. : 7,082,781 B2  Page 1 of 1
APPLICATION NO. : 10/475429
DATED : August 1, 2006
INVENTOR(S) : Yoshimasa Kikuchi et al.

It is certified that error appears in the above-identified patent and that said Letters Patent is hereby corrected as shown below:

On the Title page, item (56) References Cited section, Under "FOREIGN PATENT DOCUMENTS"

In the five (5) lines following
    "JP    51-078048    7/1976,"
insert
    --JP    39434/1980    3/1980
      JP    62-68520    3/1987
      JP    7-233966    9/1995
      JP    10-205819    8/1998--; and In the line following
    "JP    2000-257968    9/2000,"
insert
    --JP    2001-62242    3/2001--.

Signed and Sealed this

Twenty-eighth Day of August, 2007

JON W. DUDAS
*Director of the United States Patent and Trademark Office*